United States Patent
Katou et al.

(10) Patent No.: US 6,889,898 B2
(45) Date of Patent: May 10, 2005

(54) BILL DEPOSIT/WITHDRAWAL MACHINE FOR DEPOSITING/WITHDRAWING BILLS

(75) Inventors: Riichi Katou, Nagoya (JP); Kunihisa Matsuura, Aichi-ken (JP); Itsunori Utsumi, Owariasahi (JP); Kenji Okuna, Seto (JP)

(73) Assignee: Hitachi, Ltd., Tokyo (JP)

( * ) Notice: Subject to any disclaimer, the term of this patent is extended or adjusted under 35 U.S.C. 154(b) by 207 days.

(21) Appl. No.: 10/443,051

(22) Filed: May 22, 2003

(65) Prior Publication Data

US 2003/0205618 A1 Nov. 6, 2003

Related U.S. Application Data

(63) Continuation of application No. 10/191,326, filed on Jul. 10, 2002, now Pat. No. 6,572,013, which is a continuation of application No. 09/455,535, filed on Dec. 7, 1999, now Pat. No. 6,422,458.

(30) Foreign Application Priority Data

Dec. 8, 1998 (JP) .......................................... 10-348413

(51) Int. Cl.[7] .............................................. G06F 17/60
(52) U.S. Cl. ...................... 235/379; 235/375; 235/380; 235/381
(58) Field of Search ................................ 235/379, 375, 235/380, 381

(56) References Cited

U.S. PATENT DOCUMENTS

| | | | |
|---|---|---|---|
| 4,905,839 A | 3/1990 | Yuge et al. | |
| 4,928,230 A | 5/1990 | Kawamura | |
| 5,313,050 A | 5/1994 | Hiroki et al. | |
| 5,553,320 A | 9/1996 | Matsuura et al. | |
| 5,597,996 A * | 1/1997 | Flood | 235/379 |
| 6,206,284 B1 | 3/2001 | Do et al. | |
| 6,225,902 B1 | 5/2001 | Gahan | |
| 6,241,150 B1 | 6/2001 | Patterson | |
| 6,285,988 B1 | 9/2001 | Nogami | |
| 6,315,194 B1 | 11/2001 | Graef et al. | |
| 6,378,770 B1 * | 4/2002 | Clark et al. | 235/379 |
| 6,422,458 B1 * | 7/2002 | Katou et al. | 235/379 |
| 6,474,549 B2 * | 11/2002 | Katou et al. | 235/379 |
| 6,520,408 B1 * | 2/2003 | Force et al. | 235/379 |
| 6,568,591 B2 * | 5/2003 | Modi | 235/379 |
| 6,572,013 B2 * | 6/2003 | Katou et al. | 235/379 |
| 2002/0088850 A1 * | 7/2002 | Katou et al. | 235/379 |
| 2002/0092905 A1 * | 7/2002 | Katou et al. | 235/379 |

FOREIGN PATENT DOCUMENTS

| | | |
|---|---|---|
| GB | 2 225 662 A | 6/1990 |
| JP | 7-267513 | 10/1995 |
| JP | 10-188074 | 7/1998 |
| JP | 11-219468 | 8/1999 |
| WO | WO/97/13225 | 4/1997 |
| WO | WO 97/13225 | 4/1997 |

* cited by examiner

Primary Examiner—Karl D. Frech
Assistant Examiner—Allyson N Sanders
(74) Attorney, Agent, or Firm—Antonelli, Terry, Stout & Kraus, LLP

(57) ABSTRACT

A bill deposit/withdrawal machine for performing deposit or withdrawal of bills according to a transaction of a user, includes a deposit/withdrawal port for performing deposit or withdrawal of bills, a bill discriminating unit for discriminating bills, at least one bill accepting box for accepting bills transported from the deposit/withdrawal port and/or accepting bills to be transported to the deposit/withdrawal port and a bill transport path for connecting the deposit/withdrawal port and the bill accepting box to transport bills. The bill accepting box is transversely disposed to support bills in a standing position at least one of enables accepting bills transported through the bill transport path and delivering bills to be transported through the bill transport path. The bill accepting box is formed to be detachable from front and back face sides of the bill deposit/withdrawal machine.

7 Claims, 27 Drawing Sheets

CONTROL BLOCK DIAGRAM OF AUTOMATED TELLER MACHINE 1

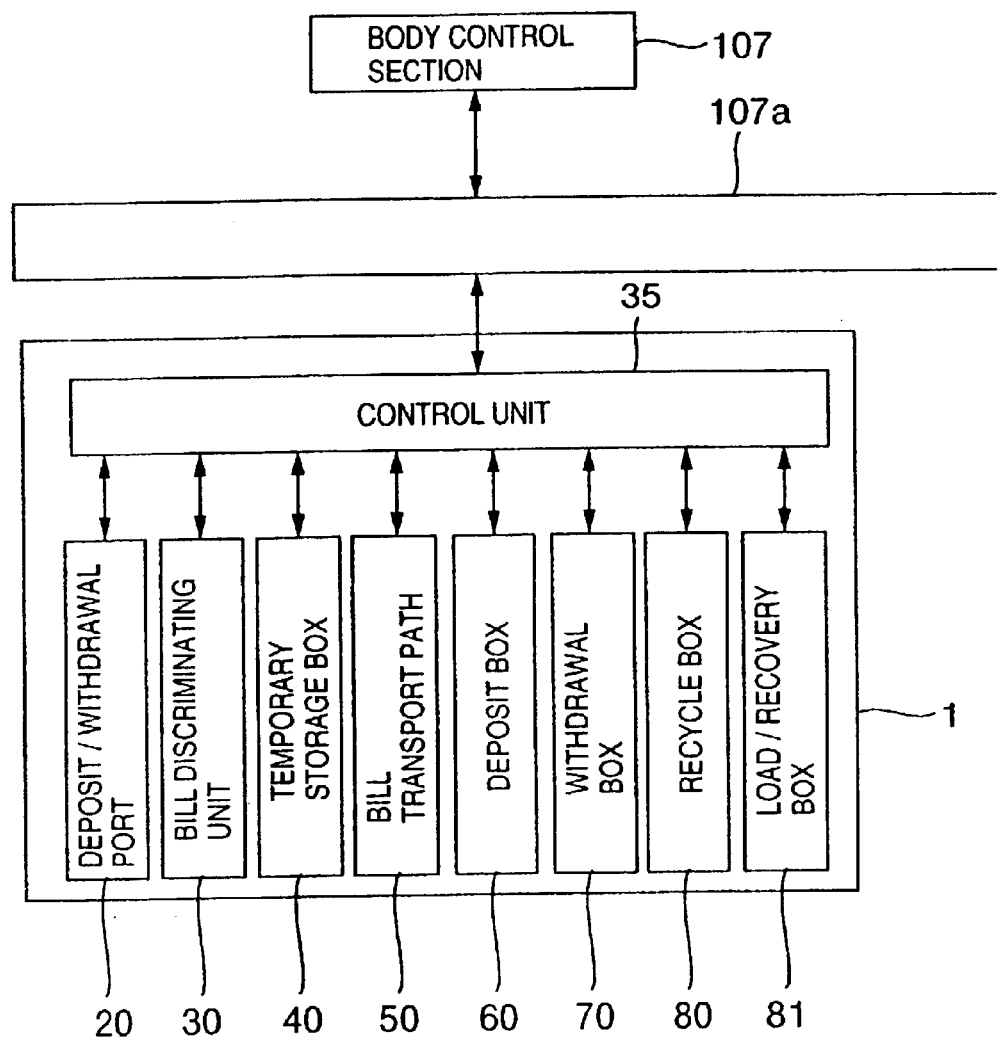

DEPOSIT COUNT AND FORGOTTEN BILL COUNT

DEPOSIT ACCEPTANCE AND FORGOTTEN BILL ACCEPTANCE

CANCEL RETURN

FIRST STAGE OF CANCEL RETURN PERFORMED
WHEN TRANSPORTATION PATH 501e IS ABSENT

SECOND STAGE OF CANCEL RETURN PERFORMED
WHEN TRANSPORTATION PATH 501e IS ABSENT

WITHDRAWAL

DEPOSIT

DELIVERY OPERATION

ACCEPTING OPERATIO

DEPOSIT

RECOVERY COUNT FROM RECYCLE BOXES 1 AND 2

RECOVERY ACCEPTANCE

DEPOSIT COUNT

DEPOSIT ACCEPTANCE

CANCEL RETURN

BILL DEPOSIT/WITHDRAWAL MACHINE FOR DEPOSITING/WITHDRAWING BILLS

CROSS-REFERENCE TO RELATED APPLICATION

This application is a continuation application of U.S. application Ser. No. 10/191,326, filed Jul. 10, 2002, now U.S. Pat. No. 6,572,013 which is a continuation of U.S. application Ser. No. 09/455,535, filed Dec. 7, 1999, now U.S. Pat. No. 6,422,458, which application is related to U.S. Ser. No. 09/339,932 filed Jun. 25, 1999, the disclosure of which is hereby incorporated by reference.

BACKGROUND OF THE INVENTION

The conventional bill deposit/withdrawal machine mounted on an automated teller machine used in, for example, a banking organ or the like includes a deposit/withdrawal port for accepting bills (or paper money) inputted by a user, delivering the bills inputted by the user, and accepting bills to be discharged to a user, a bill discriminating unit for discriminating bills, and a bill transport path for transporting bills while passing them through the bill discriminating unit. The construction of the conventional bill deposit/withdrawal machine further includes the combination of units including a temporary storage box for temporarily accepting deposited bills, a deposit box for accepting deposited bills, a withdrawal box for delivering bills for withdrawal, a recycle box for accepting and delivering bills for both deposit and withdrawal, a reject box for accepting deposited bills which are not accepted in the deposit box or the recycle box and bills which are delivered from the withdrawal box, but not withdrawn, and a load/recovery for delivering bills to be supplemented for the recycle box and accepting bills recovered from the recycle box, and so forth. Various constructions have been proposed for the construction and arrangement of those units and the route of the bill transport path for connecting those units.

For example, in an example described in JP-A-7-267513, two ring-like transport paths passing through a bill discriminating unit in one direction are configured in a character "8" form. In one of the ring-like transport paths, a deposit port, a withdrawal port, and a temporary reserve unit are arranged. In the other of the ring-like transport paths, a recycle box and a recovery box are arranged.

In an example described in JP-A-10-188074, a bi-directional transport path passing through a bill inspection unit in both directions is provided. A deposit/withdrawal port, a temporary storage box (a temporary reserve accepting unit), and a recycle box (a 10,000-yen bill and 1,000-yen bill accepting unit) are connected to the bi-directional transport path.

SUMMARY OF THE INVENTION

With the spread of automated teller machines, there is an increasing need for a bill/withdrawal machine which is smaller in size, lower in cost, and easier to use while assuring the functions and performance of the conventional machine. Regarding bills to be handled, on the other hand, there is required a machine which can handle not only Japanese yen bills but also foreign bills with the increase of handling of foreign bills in the territory of Japan and the increase of a need for bill deposit/withdrawal machines outside the territory of Japan. Furthermore, there are machines of various types according to needs. There is required a bill deposit/withdrawal machine which can be widely used and which can cope with a wide variety of needs, such as the bill kinds to be handled, arrangement of a bill slot for deposit and withdrawal regarding the user operation, the front or back face operation regarding the operation of the clerk in charge, and the bill box casing regarding the security.

In the conventional technique, a bill deposit/withdrawal machine of return type which recycles deposited bills for withdrawal includes a deposit/withdrawal port, recycle boxes for respective bill kinds, a bill discriminating unit, and a bill transport path. The bill transport path has such a complicated construction as to join/branch around the bill discriminating unit in a branch form. For instance, in the example shown in the aforementioned JP-A-7-267513, a bill transport path includes a first ring-like bill transport path which passes through a bill inspection device and pass through a lower part of a deposit/withdrawal port, and a second ring-like bill transport path which passes through the bill inspection device and pass through a recycle box. The bill transport path thus constructs a "character 8-shaped" bill transport path. In the example described in JP-A-10-188074, a bidirectional transport path passing through a bill inspection unit in both directions is provided. A deposit/withdrawal port, a temporary storage box, and a recycle box (a 10,000-yen bill and 1,000-yen bill accepting unit) are connected to the bidirectional transport path. This bidirectional transport path is composed of three bidirectional transport paths requiring respective separate driving sources. At the time of deposit operation (operation before deposit determination and operation after deposit determination) and at the time of withdrawal operation, directions of respective transport paths need to be switched independently.

Such a machine operates in an automated-machine corner of a banking organ in an unmanned state for a whole day, and needs to operate for cash deposit/withdrawal transactions of users with high reliability. For example, in deposit transactions, various users might input a folded or broken bill to the deposit port or input a coin or an alien substance together with bills to the deposit port by mistake. When delivering such a bill, it might incline largely or be broken. Depending upon the transport state, there is not a little possibility of jam occurrence in the bill transport path. Furthermore, in a machine capable of handling foreign bills as well, not only the number of bill kinds increases as compared with the case of Japanese yen bills, but also the size of bills largely differ in both the longitudinal and lateral directions according to the bill kind in many cases. There is a possibility of a large number of bills inputted to the deposit port being largely disturbed in evenness. Furthermore, as for the degree of fold and breaking of bills, there are bills in conditions worse than those of Japanese yen bills, when seen from the circulating situation of bills in various countries. In the above described conventional example, the bill transport path has complicated branch/confluent points. Therefore, reduction of bill jams in the bill transport path becomes an important problem.

Furthermore, in the above described conventional example, the construction is expandable and universal as to the number of bill kinds to be handled. However, the above described universality capable of coping with various needs concerning the operability of the user and the clerk in charge and security has not been considered.

A first object of the present invention is to provide a bill deposit/withdrawal machine having a simple bill transport path construction.

A second object of the present invention is to provide a highly reliable bill deposit/withdrawal machine which is reduced in bill jam not only for Japanese yen bills but also for bills of various sizes.

A third object of the present invention is to provide automated teller machines satisfying various specifications as to the operability of the user and the clerk in charge and the security, and provide a bill deposit/withdrawal machine having a high general-purpose ability as to the operability of the user and the clerk in charge and security.

The above described objects are attained by a bill deposit/withdrawal machine according to the present invention having a deposit/withdrawal port, a bill discriminating unit, bill accepting boxes, and a bill transport path.

In accordance with a first aspect of the present invention, a deposit/withdrawal port and a bill discriminating unit are disposed in an upper part of the bill deposit/withdrawal machine, whereas bill accepting boxes are disposed in a lower part of the bill deposit/withdrawal machine. A bill transport path is constructed so as to be able to be divided into the upper part and the lower part. Apart from a machine casing surrounding the whole of an automated teller machine, a bill box casing surrounding only a lower part of the bill deposit/withdrawal machine composed of a lower bill transport path and the bill accepting boxes can be mounted. The lower bill transport path is disposed near the wall face of user's operation side of the bill box casing, or near the wall face of the opposite side.

In accordance with a second aspect of the present invention, the lower bill transport path is constructed so as to be openable and closable in order that the bill accepting boxes can be individually operated in the horizontal direction of either of the user's side and its opposite side.

In accordance with a third aspect of the present invention, the lower bill transport path is constructed so as to be reversible in the forward-backward direction in order that the lower bill transport path is disposed on a side opposite to the user's side in the case of a machine of front operation type and on the user's side in the case of a machine of back operation type.

Owing to such constructions, automated teller machines of various specifications in aspects of operability of the clerk in charge and security are provided. In addition, a bill deposit/withdrawal machine which is highly versatile in aspects of operability of the clerk in charge and security can be provided.

In accordance with a fourth aspect of the present invention, the bill transport path is formed of a ring-like main bill transport path for transporting bills through a bill discriminating unit unidirectionally, unit transport paths for connecting a deposit/withdrawal port and a temporary storage box to the main bill transport path, and a bidirectional accepting box transport path for connecting at least one bill accepting boxes to the main bill transport path.

In accordance with a fifth aspect of the present invention, a temporary storage box includes a rotary drum, winds bills transported from the bill discriminating unit around the rotary drum one after another to store the bills, and transport the wound bills to the bill transport path by rotating the rotary drum reversely after materialization of a predetermined transaction. The temporary storage box serves not only as a temporary deposited bill storage box for storing bills kind-settled in the bill discriminating unit out of deposited bills until materialization of a transaction, but also as a temporary withdrawal rejected bill storage box for storing bills which are not kind-settled in the bill discriminating unit out of bills delivered from the bill accepting box at the time of withdraw transaction, until materialization of a transaction. As a result, a highly reliable bill deposit/withdrawal machine which is simple in bill transport path construction and low in risk of bill jam for bills of various sizes can be provided.

BRIEF DESCRIPTION OF THE DRAWING

FIG. 4 is a block diagram showing control relations of a bill deposit/withdrawal machine in an embodiment of the present invention;

DESCRIPTION OF THE EMBODIMENTS

<First Embodiment>

Figure 1:
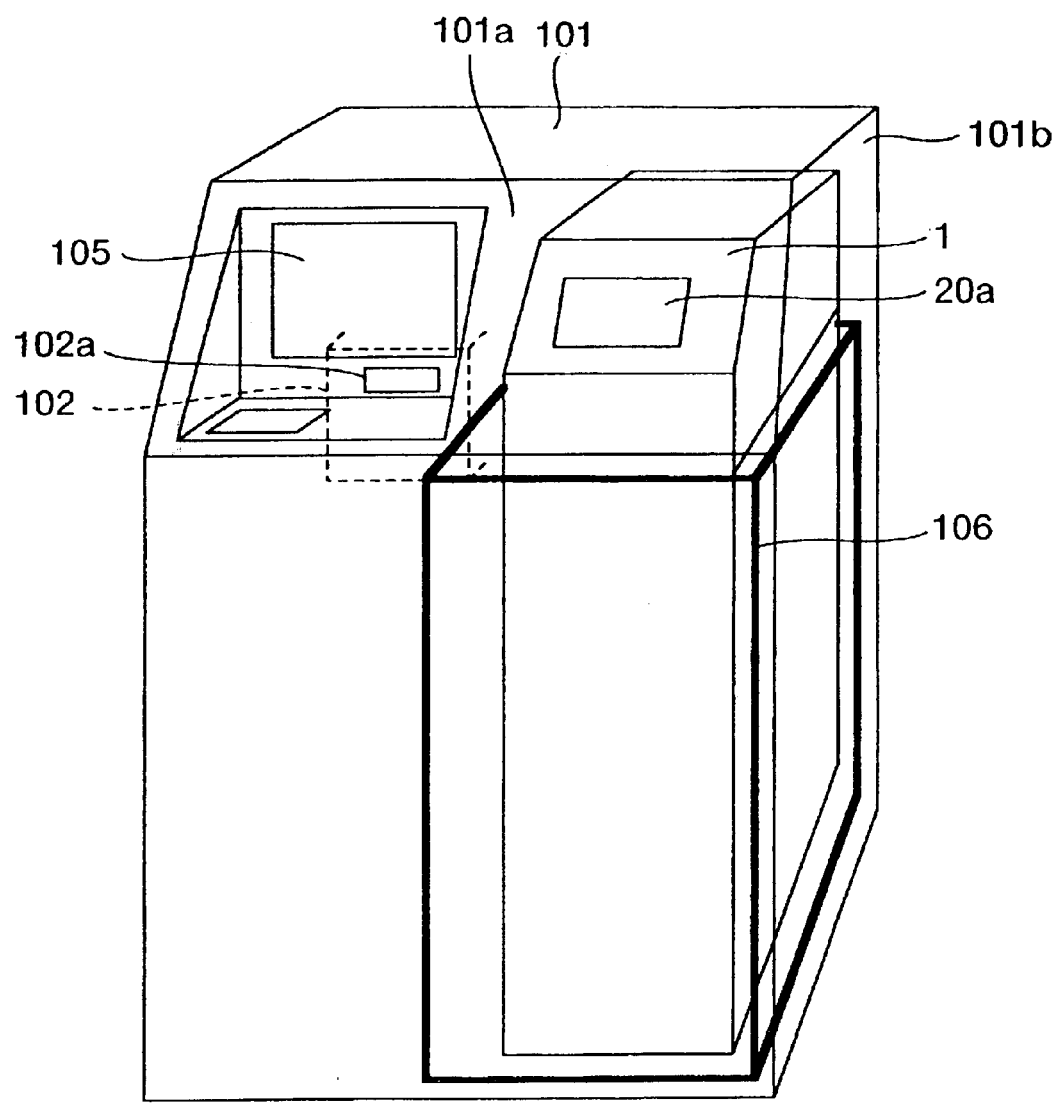
FIG. 1 is an oblique view showing an exterior view of an embodiment of an automated teller machine to which a first embodiment of the present invention is applied.

Hereafter, an embodiment of the present invention will be described by referring to the drawing. FIG. 1 is an oblique view showing an exterior view of an automated teller machine to which the present invention is applied.

On the left inside of an automated teller machine 101, there are provided a card/slip processing mechanism 102 and a customer operation section 105. The card/slip processing mechanism 102 communicates with a card slot 102a provided in an upper front plate 101a to process a user's card, and prints and delivers a transaction particulars slip. The customer operation section 105 is used for displaying and inputting the contents of a transaction. Furthermore, on the right inside of the automated teller machine 101, there is provided a bill deposit/withdrawal machine 1 for processing bills. In the upper inclined front plate 101a, a bill slot 20a is provided. A bill acceptance section provided under the bill deposit/withdrawal machine 1 is surrounded by a bill box casing 106 made of a thick iron plate having a thickness of several tens mm which is separate from a machine casing 101b. Although the machine casing 101b also has a rigid casing structure, the bill box casing 106 has a more rigid structure to improve the security. This automated teller machine 101 can conduct processing such as user's deposit, withdrawal, and transfer by using a card, bills, and a slip as a medium.

Figure 2:
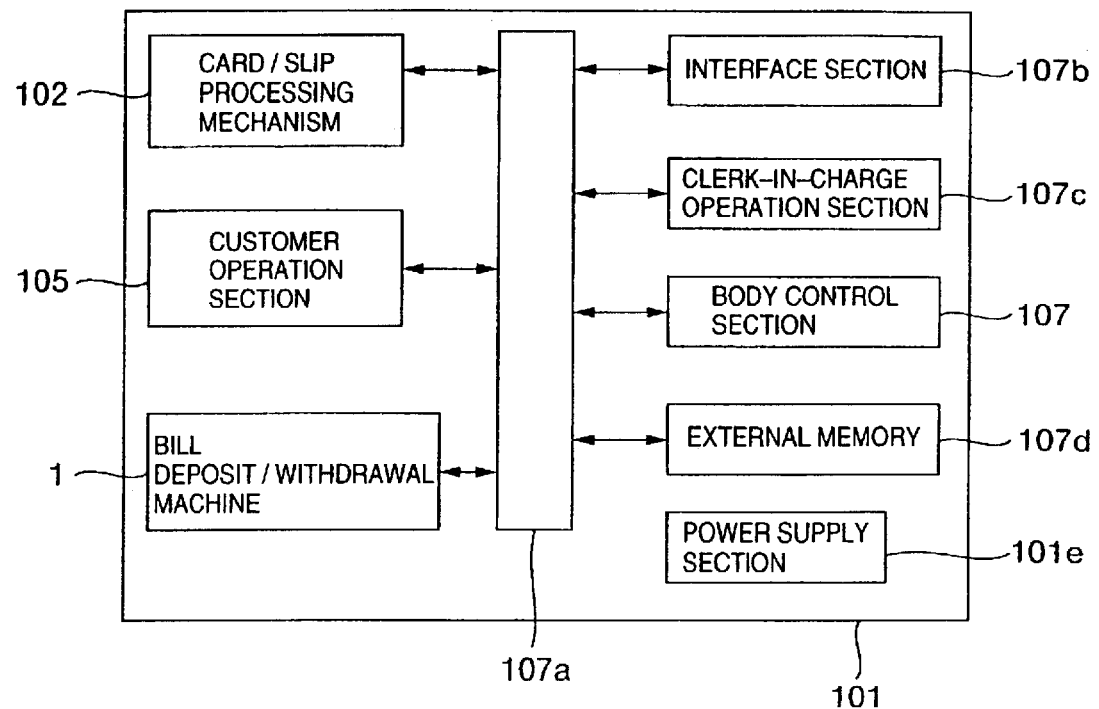
FIG. 2 is a block diagram showing control relations of an automated teller machine in an embodiment of the present invention.

FIG. 2 is a control block diagram showing control relations of the present machine. As described before, the card/slip processing mechanism 102, the bill deposit/withdrawal machine 1, and the customer operation section 105 which are housed in the automated teller machine 101 are connected to a body control section 107 through a bus 107a and perform their required operations under the control of the body control section 106. Though the body control section 107 is also connected through the bus 107a to an interface section 107b, a clerk-in-charge operation section 107c and an external memory 107d to make the communication of necessary data therewith, the detailed description thereof will be omitted since there is no direct relation with the features of the present invention. Reference numeral 101e shown in FIG. 2 denotes a power supply section for supplying electric power to the above-mentioned mechanisms and components.

Figure 3:
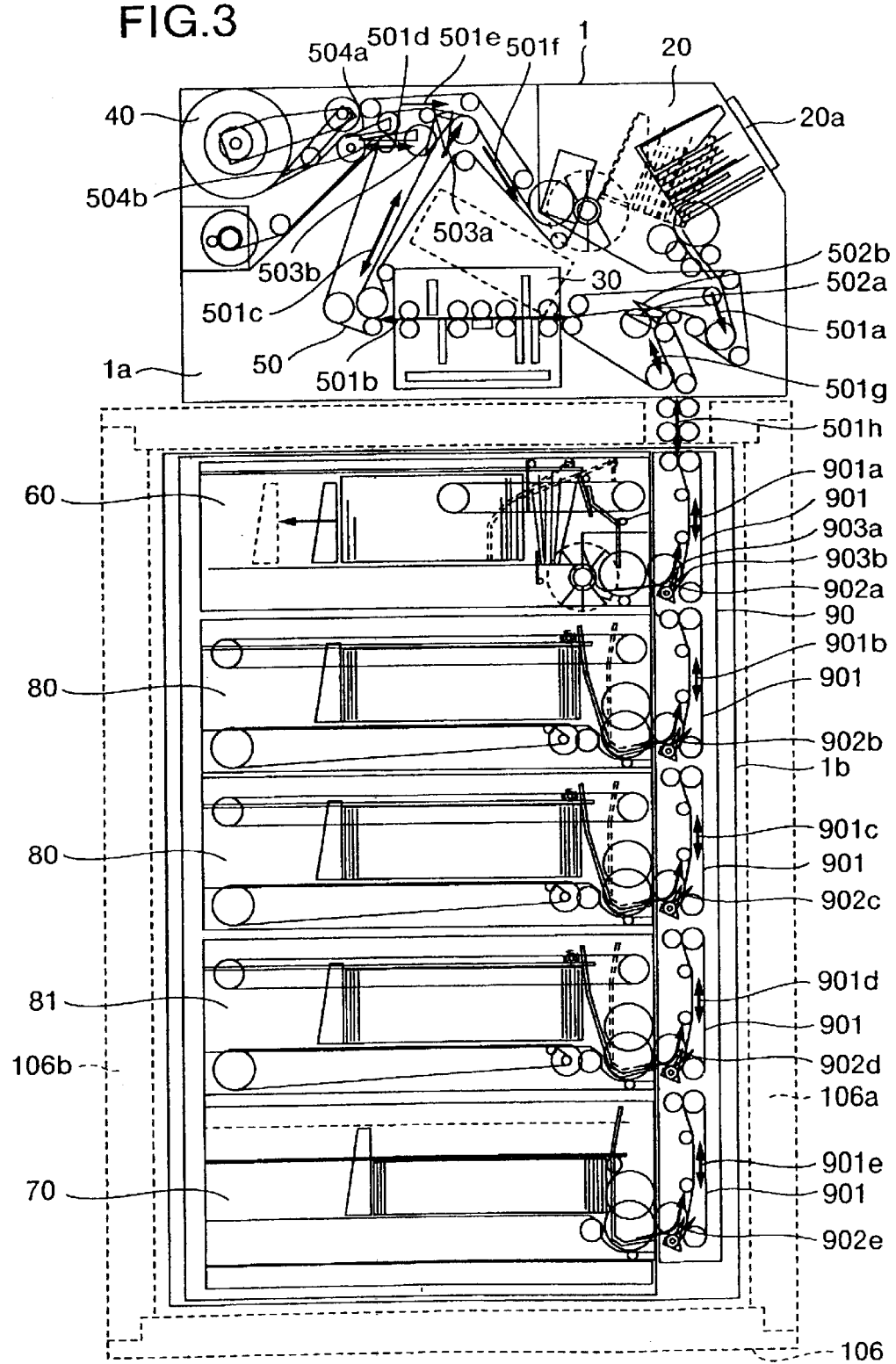
FIG. 3 is a side view showing a first embodiment of a bill deposit/withdrawal machine according to the present invention.

FIG. 3 is a side view showing the construction of that bill deposit/withdrawal mechanism 1 in the automated teller machine shown in FIG. 1 to which the present invention relates.

The bill deposit/withdrawal mechanism 1 is composed of a deposit/withdrawal port 20 for which a user makes the input/takeout of bills, a bill discriminating unit 30 for discriminating bills, a temporary storage box 40 for accepting deposited bills once until the materialization of a transaction, one deposit box 60 for accepting, at the time of deposit, bills for which the materialization of a transaction is completed, one withdrawal box 70 for accepting bills for withdrawal, two recycle boxes 80 for both deposit and withdrawal, a load/recovery box 81 for accepting bills to be supplemented for the recycle boxes 80 and bills recovered from the recycle box, a bill transport path 50 for transporting bills to the deposit/withdrawal port 20, the temporary storage box 40, the deposit box 60, the withdrawal box 70, the recycle boxes 80, and the load/recovery box 11 while passing the bills through the bill discriminating unit 30, and a control unit which is not illustrated.

As shown in FIG. 4, a control unit 35 is connected to the body control unit 107 of the machine through the bus 107a. The control unit 35 performs the control of the bill deposit/withdrawal mechanism 1 in accordance with a command from the body control section 107 and the detection of the state of the bill deposit/withdrawal mechanism 1, and sends the state of the bill deposit/withdrawal mechanism 1 to the body control section 107, as required. In the bill deposit/withdrawal mechanism 1, the control unit 35 is connected to a driving motor, electromagnetic solenoid or sensor of each unit (the deposit/withdrawal port 20, the bill discriminating unit 30, the temporary storage box 40, the bill transport path 50, the deposit box 60, the withdrawal box 70, the recycle boxes 80, and the load/recovery box 81) to control the driving of actuators in accordance with transactions while monitoring the states by use of the sensors.

As shown in FIG. 3, the present deposit/withdrawal machine 1 is composed of an upper transport mechanism 1a and a lower bill mechanism 1b. The upper transport mechanism 1a is composed of the deposit/withdrawal port 20, the bill discriminating unit 30, the temporary storage box 40, and the bill transport path 50. The lower bill mechanism 1b is composed of the deposit box 60, the withdrawal box 70, the recycle boxes 80, the load/recovery box 81, and an openable/closable transport path 90 provided in front of respective accepting boxes. Furthermore, the lower bill mechanism 1b is mounted within the bill box casing 106 made of a thick iron plate having a thickness of approximately 50 mm. The transport path of the upper transport mechanism 1a is connected to the transport path of the lower transport mechanism 1b through a coupling transport path 501h.

The coupling transport path 501h is disposed in a position of a top iron plate of the bill box casing 106 surrounding the lower transport mechanism 1b where a transport path 501g of the upper transport mechanism 1a is coupled to a transport path 901a of the lower transport mechanism 1b. A slit opened in the top iron plate has a length for passing a bill, and a size of a width of transport rollers attached so as to sandwich and deliver a bill transported to the slit. If the lower transport mechanism 1b is not surrounded by the bill box casing and the upper transport mechanism 1a is placed directly on the lower transport mechanism 1b, then the coupling transport path is not always necessary. The driving source (motor) of the transport path may be provided for each of the transport path of the upper transport mechanism and the transport path of the lower transport mechanism. Alternatively, a single driving source may be used, and the driving force may be transmitted through a gear provided in the transport path 501g-501h-901a.

Figure 5A:
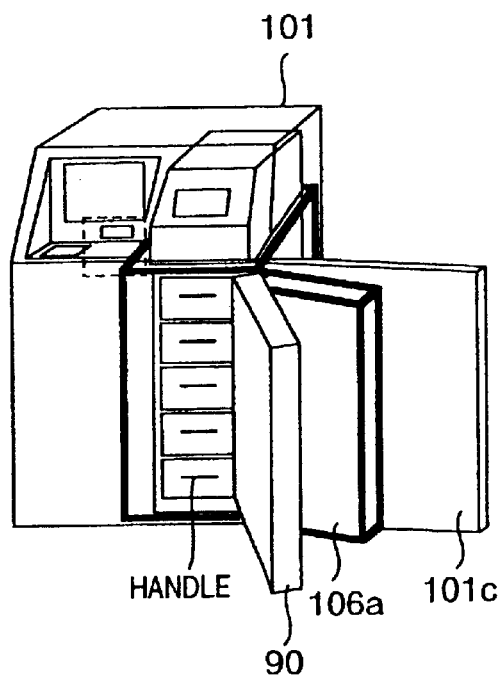
FIGS. 5A and 5B are diagrams showing an operation method of the automated teller machine shown in FIG. 1.

As shown in FIG. 1, the bill deposit/withdrawal machine 1 having the construction heretofore described is mounted on the right inside of the automated teller machine 101. Depending upon the machine type, the bill deposit/withdrawal machine 1 can be a front operation type or a back operation type. Depending upon whether the bill deposit/withdrawal machine 1 is the front operation type or the back operation type, the construction differs slightly. In such a machine of front operation type that a clerk in charge operates from the front of the machine as shown in FIG. 5A, a front door 101c of the machine 1 and a front door 106a of the bill box casing 106 are adapted to be openable and closable. When the doors 101c and 106a are opened and the opened/closed transmission path 90 of the bill deposit/withdrawal machine 1 is further opened as illustrated, the accepting boxes having respective handles appear. The clerk in charge can pull out each accepting box by means of this handle, and perform operations such as supplementation and recovery of bills and other maintenance works.

Figure 5B:
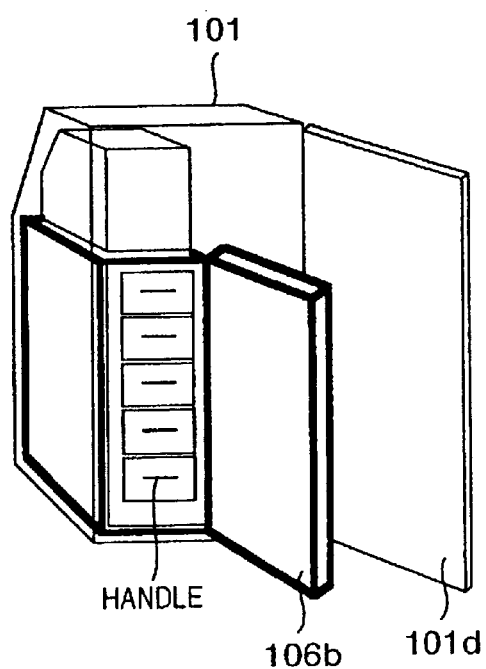

On the other hand, in such a machine of operation type that a clerk in charge operates from the back of the machine as shown in FIG. 5B, a back door 101d of the machine 1 and a back door 106b of the bill box casing 106 are adapted to be openable and closable. When the doors 101d and 106b are opened as illustrated, the accepting boxes having respective handles appear. The clerk in charge can pull out each accepting box by means of this handle, and perform operations.

By adopting such a construction that the opened/closed transmission path is disposed near the front door or the back door of the lower bill mechanism as heretofore described, it becomes easy to perform the supplementation and recovery operation of bills and removal operation of a jammed bill at the time of occurrence of an abnormality. Operability is thus improved. Furthermore, the operation of the clerk in charge can be conformed to both the front operation type and the back operation type by merely disposing the opening and closing door in the front face or back face.

By the way, if each accepting box is provided with rails, each accepting box can be pulled out smoothly.

Figure 6:
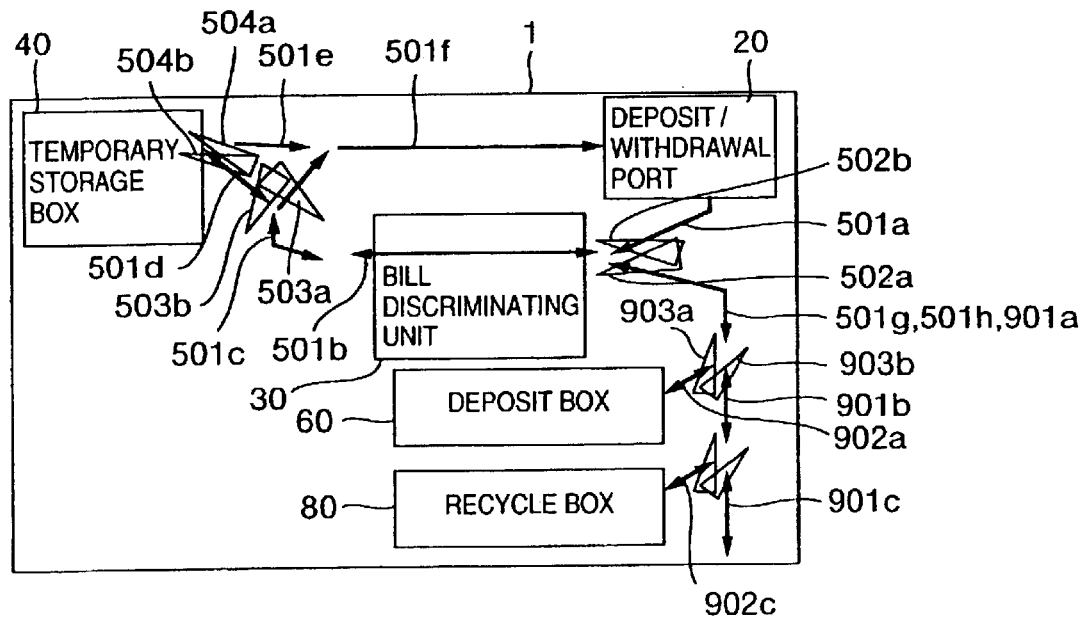
FIG. 6 is a schematic diagram of a bill transport path construction in a first embodiment of the present invention.

Furthermore, the bill transport path 50 passes through the bill discriminating unit 30 in both directions. By way of the transport path indicated by arrows 501a to 501h and 901a to 901e, the bill transport path 50 connects the deposit/withdrawal port 20, the temporary storage box 40, the deposit box 60, the withdrawal box 70, the recycle box 80, and the load/recovery box 81. Among arrows, each of unidirectional arrows indicates a unidirectional bill transport path for transporting bills only in the direction of the arrow. Each of bidirectional arrows indicates a bidirectional transport path for transporting bills in one of the both directions switched every transaction operation. FIG. 6 schematically shows relations between the bill transport path 50 (501a to 501h and 901a to 901e) and respective units (20, 30, 40, 50, 60, 70, 80, and 81) illustrated in FIG. 3. (For simplifying the drawing, a part of 50, 70, and 81 are omitted in FIG. 6.) The bill transport path 50 is driven by a driving motor which is not illustrated. For each of transaction operations as shown in FIGS. 7 to 13, the rotation direction of the motor is switched. Furthermore, switching gates 502, 503, 504 and five switching gates 902 are disposed at branch points of the bill transport path 50. For each of the transaction operations, the bill transport direction is switched as indicated by symbols "a" and "b."

In the bill transport path 50, five bill transport paths 901a to 901e disposed in the lower bill mechanism 1b and disposed in front of the deposit box 60, the withdrawal box 70, the recycle box 80, and the load/recovery box 81 construct the opened/closed transmission path 90 adapted to be able to be opened/closed as one body. In the machine of the front operation type shown in FIG. 5A, the clerk in charge can open the opened/closed transmission path 90, and operate the deposit box 60, the withdrawal box 70, the recycle box 80, and the load/recovery box 81.

Prior to description of operation of each of transaction operations shown in FIGS. 7 to 13, details of the above-mentioned units (20, 30, 40, 50, 60, 70, 80 and 81) of the present embodiment and operations thereof will be hereafter described in detail by referring to FIGS. 14 to 22.

Figure 14:
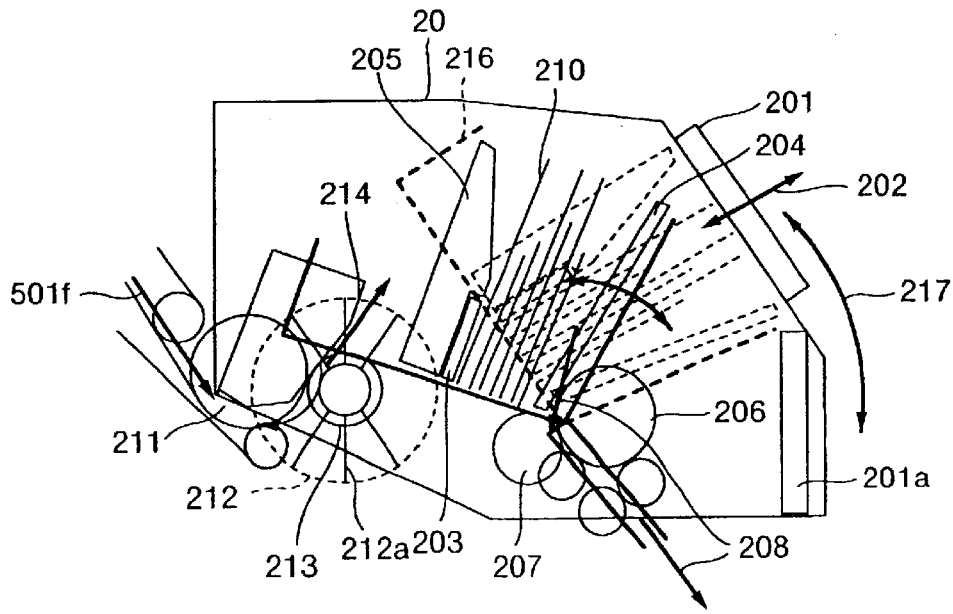
FIG. 14 is a side view of a deposit/withdrawal port in an embodiment of the present invention (basic construction diagram)

The deposit/withdrawal port 20 has a shutter 201, as shown in FIG. 14. The shutter 201 can be slid in a direction of arrow 217 to be opened/closed. When the shutter 201 is moved into a state indicated by illustrated 201a, the user can take out bills at the time of withdrawal and input bills at the time of deposit in a direction indicated by arrow 202. A bill hopper 216 is rotated between a position indicated by a solid line and a position indicated by a broken line.

Figure 15:
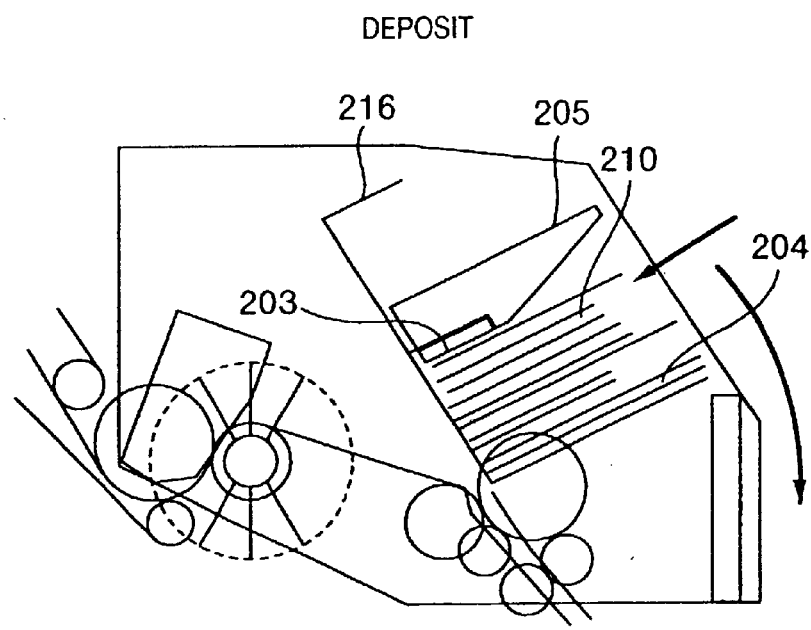
FIG. 15 is a side view of a deposit/withdrawal port in an embodiment of the present invention (at the time of deposit)
Figure 16:
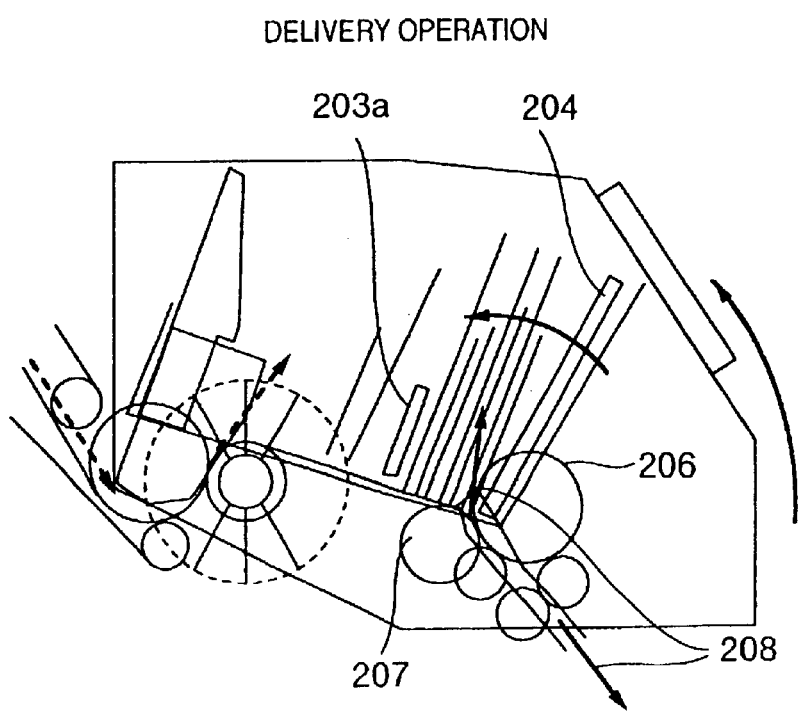
FIG. 16 is a side view of a deposit/withdrawal port in an embodiment of the present invention (at the time of deliver)

When a user deposits bills at the time of deposit transaction, the shutter 201 is opened as shown in FIG. 15. Bills 210 are inputted between a front plate 204 and a push plate 203 with a rear plate 205. The front plate 204, the push plate 203, and the rear plate 205 are supported by the bill hopper 216. Subsequently, at the time of delivery operation of deposited bills, the shutter 201 is closed and the bill hopper 216 is rotated as shown in FIG. 16. Thereafter, the bills are pushed by the plate 203 in a direction of a feed roller 206 so that the push plate and the front plate are brought into the states of 203a and 204a and the bills are fed forward by a rotating operation of the feed roller 206, while a two-sheet feed is prevented by a gate roller 207 which does not rotate in the direction of delivery. Thus, the bills 210 at the deposit/withdrawal port 2 are delivered in a direction indicated by arrow 208 so that they join the bill transport path 50 and are then taken into the machine.

Figure 17:
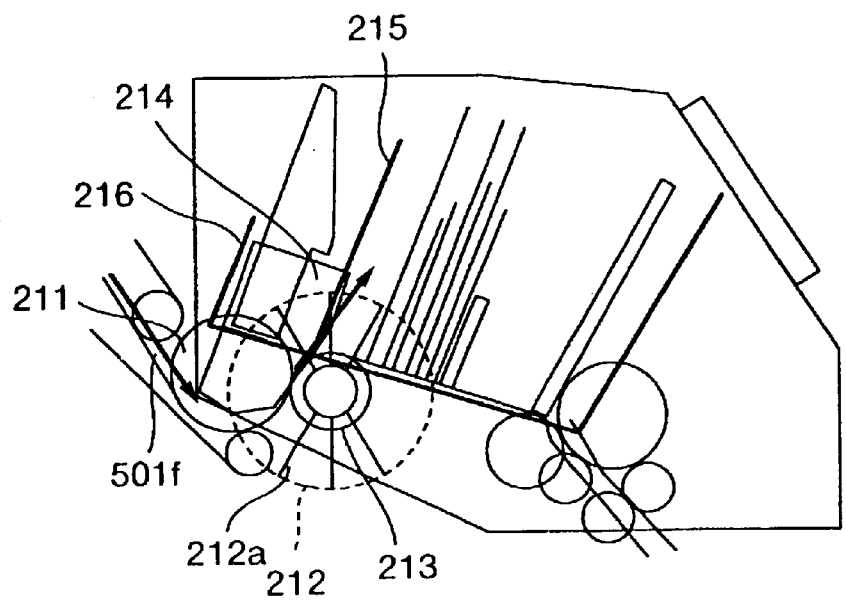
FIG. 17 is a side view of a deposit/withdrawal port in an embodiment of the present invention (at the time of acceptance)
Figure 18:
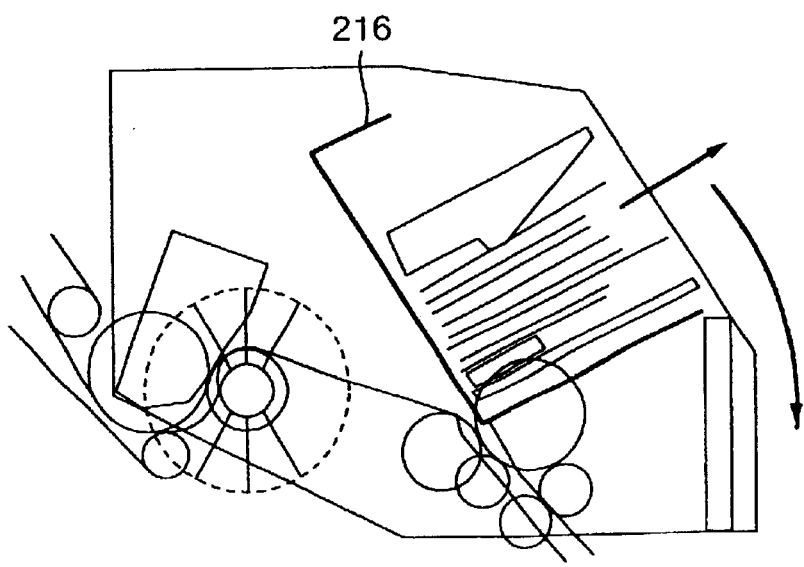
FIG. 18 is a side view of a deposit/withdrawal port in an embodiment of the present invention (at the time of withdrawal)

As shown in FIG. 17, bills withdrawn from the machine and bills rejected for reasons such as the difficulty in bill discrimination at the time of deposit or the like are transported from the inside of the machine in a direction of arrow 501*f*, and they are sent between a rotating stack roller 211 and a backup roller 213. A brush roller 212 is disposed on the same axis as the backup roller 213 and has elastic members 212*a* radially arranged, as shown. The brush roller 212 is rotated by a driving source (not shown) independently of the backup roller 213. The bill sent between the stack roller 211 and the backup roller 213 contacts the elastic member 212*a* of the stopped brush roller 212 and is passed while receiving a frictional resistance force against a stack guide 214 owing to an elastic deformation force of the elastic member 212*a*. The bill is stopped once at a bill position indicated by solid line 215 where a sandwiching transport force of the stack roller 211 and the backup roller 213 runs out. Immediately thereafter, the brush roller 212 is rotated so that the bill is stacked in a space between the push plate 203*a* and a rear plate 205*a*. Accordingly, the bill does not fly out upward in an accepting space. By merely scratching the bill in a horizontal direction by the brush roller 212, no interference between continuously transported bills is caused and hence a vertical unevenness is rarely to be caused. Accordingly, it becomes possible for the user to easily take out the bills. As shown in FIG. 18, the bill hopper 216 is rotated, and then the shutter 201 is opened. Bills accepted in the bill hopper 215 are discharged to the user.

Description will be given by referring to FIG. 3 again. Though the details are not shown, the bill discriminating unit 30 is composed of a two-sheet detecting portion which includes a pair of rollers and detects the displacement of the rollers at the time of transport of bills between the rollers to detect whether or not there is the superimposition of two sheets one over the other, and a discriminating portion which detects the print of a bill by means of an image sensor or the like to discriminate the kind of that bill and the truth or falsehood thereof. The control unit 35 is informed of the result of discrimination for each passed bill.

Figure 19:
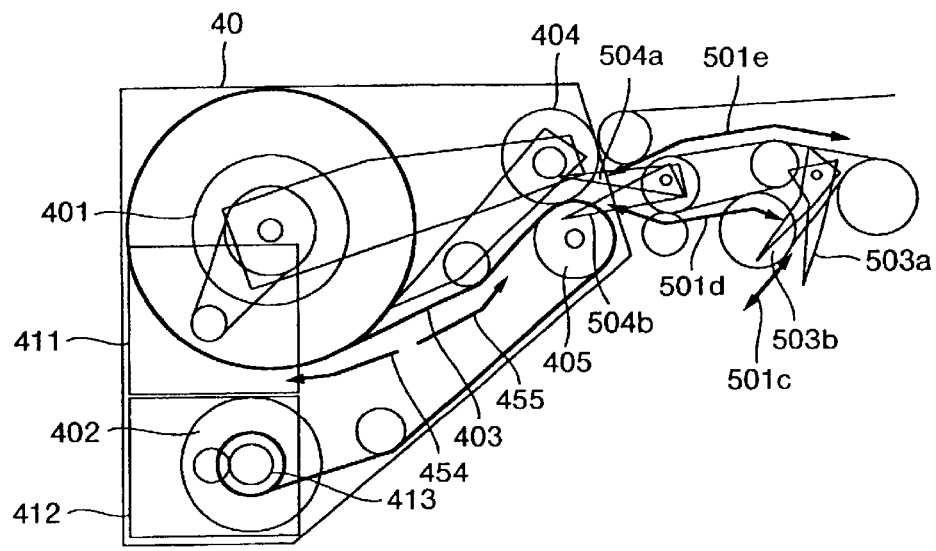
FIG. 19 is a diagram showing a construction example of a temporary storage box in an embodiment of the present invention.

The temporary storage box 40 has a function of successively accepting bills deposited from the deposit/withdrawal port 20 and kind-settled by the bill discriminating unit 30 at the time of deposit transaction, reserving them temporarily until the transaction is materialized, and successively discharging the bills after the materialization of the transaction. Besides, though the details will be described later, the temporary storage box 40 in the present embodiment has a function of accepting bills which are not kind-settled by the bill discriminating unit 30 at the time of withdrawal transaction, reserving them temporarily until the withdrawal transaction is materialized, and after the termination of the operation, discharging the bills at the time of withdrawal reject acceptance operation. The construction of the temporary storage box 4 is shown in FIG. 19. The temporary storage box 40 is composed of an inducing tape made of plastic, a rotary drum 401 for winding a bill transported together with the inducing tape 403 around it, a winding shaft 402 for winding only the inducing tape 403 around it, an inlet roller 405 for guiding the entrance of a bill to the rotary drum 401 and rotating together with the inducing tape 403, and a backup roller 404 provided opposite to the inlet roller 405. The rotary drum 401 and the winding shaft 402 supporting the opposite ends of the inducing tape 403 are respectively connected to separate driving sources 411 and 412. The connection of the winding shaft 402 to the driving source 412 is made through a torque limiter 413.

An initial-portion sensor (not shown) for detecting an initial position of the inducing tape 403 and a near-fullness sensor (not shown) for detecting the vicinity of the end of the inducing tape 403 may be provided while an encoder (not shown) for detecting the current winding amount of the inducing tape 403 with the initial position of the inducing tape 403 taken as a reference is attached to the inlet roller 405, so that the control unit 35 makes a timing control or the like by use of signals from the sensors and the encoder. Also, a temporary storage box passage sensor for sensing bills to be accepted in the temporary storage box and discharged therefrom to count the bills may be provided on the transport path from the inlet roller 405 on the rotary drum 401 side.

Before acceptance operation, the inducing tape 403 has been wound on the winding shaft 402 side up to the initial position. In the case where accepted bills are to be accepted into the temporary storage box 40, the driving source 411 is driven in such a direction as to wind the inducing tape 403 around the rotary drum 401. The rotary drum 401 rotates so that the travel speed of the inducing tape 403 becomes substantially equal to the entering speed of bills. The switching gate 503 is switched to a direction indicated by 503*a* in FIG. 19 and the inlet/outlet gate 504 is switched to a direction indicated by 504*a*. Thereby, the deposited bills transported in the direction of arrow 501*c* are successively wound around the rotary drum 401 through a route of arrows 501*d* and 454. On the other hand, the winding shaft 402 is driven by the driving source 412 through the torque limiter 413 so that a tensile force is applied to the inducing tape 403. Thereby, the inducing tape 403 is wound around the rotary drum 401 with no slack and together with the bills.

At the time of discharge operation, the inlet/outlet gate 504 is switched to a direction indicated by 504*b* and the rotary drum 401 is reversely rotated while the winding shaft 402 is driven in its winding direction through the torque limiter with a tensile force applied to the inducing tape 403. Thereby, the bills wound on the rotary drum 401 are delivered on the bill transport path 50 through a route of arrow 455 in a sequence reverse to that at the time of acceptance. In the discharge operation, there are two kinds as described later. When the inlet/outlet gate 504 is switched to a direction indicated by 504*a*, the bills are discharged in a direction indicated by arrows 501*d* and 501*c*. When the inlet/outlet gate 504 is switched to a direction indicated by 504*b*, the bills are discharged in a direction indicated by arrow 501*e*.

Figure 20:
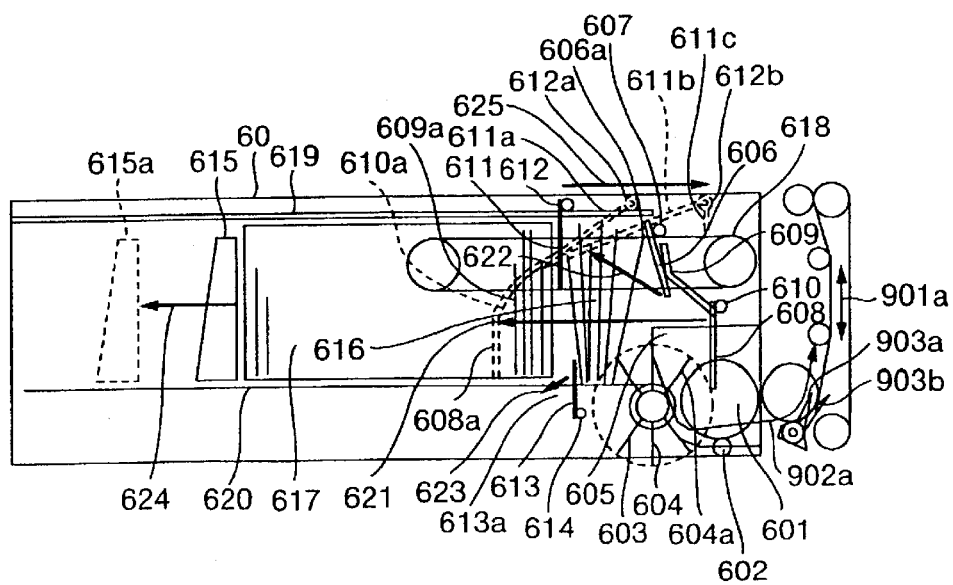
FIG. 20 is a side view of a deposit box in an embodiment of the present invention.

Referring to FIG. 3 again, the deposit box 60 is mounted one in number in the present embodiment. As shown in FIG. 20, the deposit box 60 constructs a stack mechanism composed of a rotating stack roller 601 driven through a gear by a driving source (not shown) outside the box 60, backup rollers 602 and 603 opposite to the stack roller 601, a brush roller 604 disposed on the same axis as the backup roller 603 and rotated by a driving source (not shown) independently of the backup roller, the brush roller having elastic members 604*a* radially arranged, as shown, a lower stack guide 605 and an upper stack guide 606. A bill accepting space includes a stacked-bill accepting space 617 which is formed by an upper partition plate 611, a lower partition plate 613 and a push plate 615, and a bill-under-stacking accepting space 616 which is formed by the upper partition plate 611, the lower partition plate 613, the upper stack guide 606 and the lower stack guide 605.

Bills to be accepted in the deposit box 60 are transported in a direction of arrow 902*a* from the bill transport path (indicated by arrow 901*a*) with a switching gate 903 switched as indicated by 903*b*, and are then sent between the rotating stack roller 601 and the backup rollers 602 and 603. The bill sent between the stack roller 601 and the backup roller 603 contacts the elastic member 604a of the stopped brush roller 604, and is passed while receiving a frictional resistance force against the lower stack guide 605 owing to an elastic deformation force of the elastic member 604a. The bill is stopped once in a position where sandwiching transport force of the stack roller 601 and the backup roller 603 runs out. Immediately thereafter, the brush roller 604 is rotated so that the bill is stacked in the above-mentioned bill-under-stacking accepting space 616 with no interference caused between continuously transported bills.

Next, a driving belt 618 is driven by a driving source (not shown) so that a push plate 608, a push assist guide 609, a push support shaft 610 and the upper stack guide 606 coupled to the driving belt 618 are moved up to positions of dotted lines 608a, 609a, 610a and 606a in directions of arrows 621 and 622 while the upper partition plate 611 and an upper partition plate support shaft 612 coupled to the driving belt 618 are successively moved to positions of dotted lines 611a and 612a, to positions of dotted lines 611b and 612b and to positions of dotted lines 611c and 612b in a direction of arrow 625. Thereby, the bills stacked in the bill-under-stacking accepting space 616 are pushed into the stacked-bill accepting space 617 together with bills in the stacked-bill accepting space 617 by moving the push plate 615 in a direction of arrow 624 and the lower stack guide 613 in a direction of arrow 623. Next, the driving belt 618 is driven in a reverse direction so that the push plate 608, the push assist guide 609, the push support shaft 610, the upper stack guide 606, the upper partition plate 611 and the upper partition plate support shaft 612 are returned to the initial positions to bring the bill-under-stacking accepting space 616 into an empty condition, thereby enabling the next stacking operation.

Figure 21:
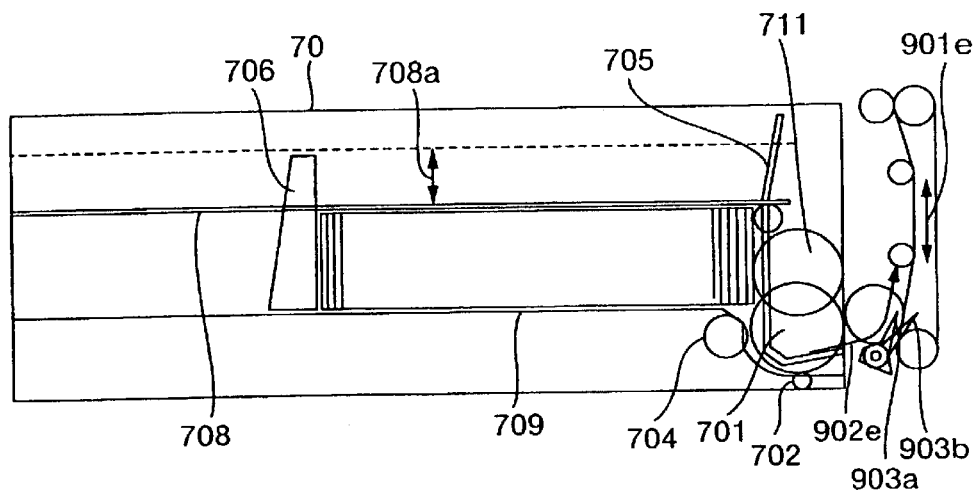
FIG. 21 is a side view of a withdrawal box in an embodiment of the present invention.

The withdrawal box 70 is mounted one in number in the present embodiment. As shown in FIG. 21, the withdrawal box 70 constructs a separation mechanism composed of a rotating feed roller 701 and a rotating pickup roller 711 which are driven through gears by driving sources (not shown) outside the box 70, a rotating backup roller 702 which is provided opposite to the feed roller 701, and a gate roller 704 which is provided opposite to the feed roller 701 and does not rotate in a delivering direction. Bills for withdrawal are set in alignment (or with evenness) by a clerk in charge into an accepting space enclosed by a bottom plate guide 709, a push plate 706, a separation guide 705 and an upper face guide 708 with the foremost bill pushed against the pickup roller 711 by a spring (not shown) coupled to the push plate 706. The push plate 706 is made movable in the accepting space to move the accepted bills so that bills to be delivered impose a predetermined pushing force upon the pickup roller 711 with the decrease in number of accepted bills. The bills pushed against the pickup roller 711 are delivered owing to the operations of the rotating feed and pickup rollers 701 and 711 and are transported one by one in a direction of arrow 902e while a two-sheet feed is prevented by the gate roller 703 which does not rotate in the delivering direction. Thus, the bills are transported along the bill transport path in a direction of arrow 901e.

Figure 22:
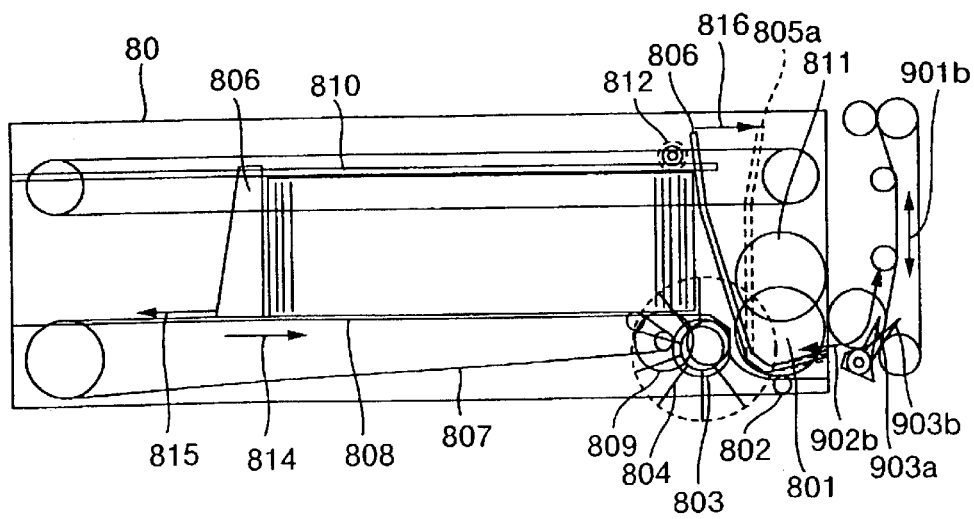
FIG. 22 is a side view of a recycle box in an embodiment of the present invention.

The recycle box 80 is mounted two in number in the present embodiment. The construction of the recycle box 80 is shown in FIG. 22.

The recycle box 80 has both the function of the deposit box 60 of continuously accepting bills and the function of the withdrawal box 70 of continuously delivering bills in a separated manner. Therefore, the recycle box 80 is an accepting box which is capable of performing acceptance and separate delivery. The recycle box 80 constructs a stack/separation mechanism composed of a stack/feed roller 801 and a pickup roller 811 which have the same shapes as the separation mechanism described with reference to the withdrawal box 70, a rotating backup roller 802, a gate roller 803 which rotates in a stacking direction and does not rotate in a delivering direction, a brush roller 804 which is disposed on the same axis as the gate roller 803 and includes radially arranged elastic members, and a separation/stack guide 805 which is made movable at the time of separation and at the time of stacking. Bills are accepted in an accepting space enclosed by a bottom plate 808, a push plate 806, a flat bottom face belt 807 suspended so that it supports the lower face of a bill in a plane upper than the bottom plate 808, and the separation/stack guide 805. The recycle box 80 is further provided with a rotating upper scratch roller 812 disposed with a sawtooth-like periphery form in the vicinity of the separation/stack guide 805 in an upper portion of the accepting section, and a rotating lower scratch belt 809 disposed with a sawtooth-like periphery form in the vicinity of the separation/stack guide 805 in a lower portion of the accepting section, so that the sawtooth-like periphery portions support the upper and lower ends of a stacked bill to maintain a standing condition of the bill while scratching the bill on the push plate 806 side.

At the time of separation operation, the separation/stack guide 805 is moved to a position indicated by dotted line 805a, and the push plate 806 and the bottom face belt 807 are made movable integrally in the accepting space to move the accepted bills so that bills to be delivered impose a predetermined pushing force upon the pickup roller 811 owing to a spring which is not shown. The bills pushed against the pickup roller 811 are delivered by the rotating stack/feed roller 801, and are transported one by one in a direction of arrow 902b while a two-sheet feed is prevented by the gate roller 803 which does not rotate in the delivering direction. Also, a switching gate 903 of the bill transport path is switched to a direction of 903b so that the bills are transported in a direction of arrow 901b.

At the time of stack operation, the separation/stack guide 805 is moved to a position indicated by a solid line, and the push plate 806 and the bottom face belt 807 are made movable integrally in the accepting space owing to driving sources (not shown) outside the recycle box to make the controlled movement of the accepted bills in a direction receding from the separation/stack guide 805 so that an entering bill transported in a direction of arrow 902b and the accepted bills do not interfere with the increase in number of accepted bills. At this time, the upper scratch roller 812 and the lower scratch roller 809 make a lefthanded rotation and a righthanded rotation, respectively, so that the sawtooth-like periphery portions support the upper and lower ends of a stacked bill to maintain a standing condition of the bill while scratching the bill on the push plate 806 side.

The load/recovery box 81 has the same construction as the recycle box 80. Although the load/recovery box 81 is not used for deposit/withdrawal transaction, it may be used as a recycle box.

Next, the operation of the bill deposit/withdrawal machine of the present embodiment will be described by referring to schematic diagrams of FIGS. 7 to 13 and FIGS. 23 to 26. (As for detailed construction and reference numerals, see FIG. 3.)

Figure 7:
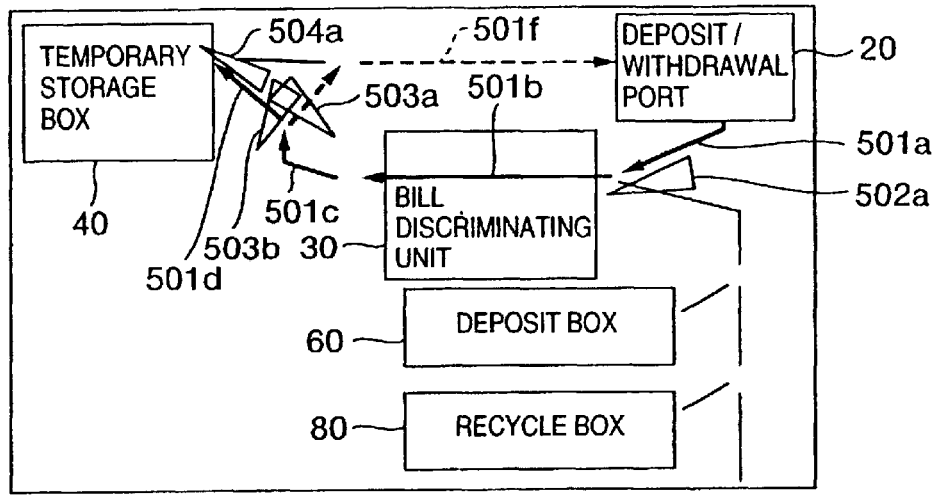
FIG. 7 is a schematic diagram of a bill transport path construction in a first embodiment of the present invention.
Figure 8:
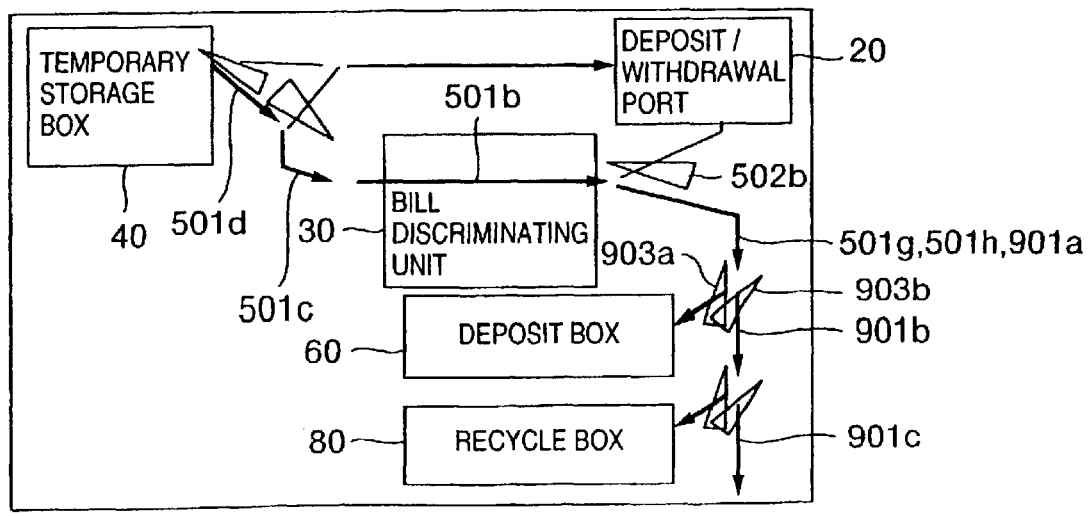
FIG. 8 is a schematic diagram of a bill transport path construction in a first embodiment of the present invention.
Figure 9:
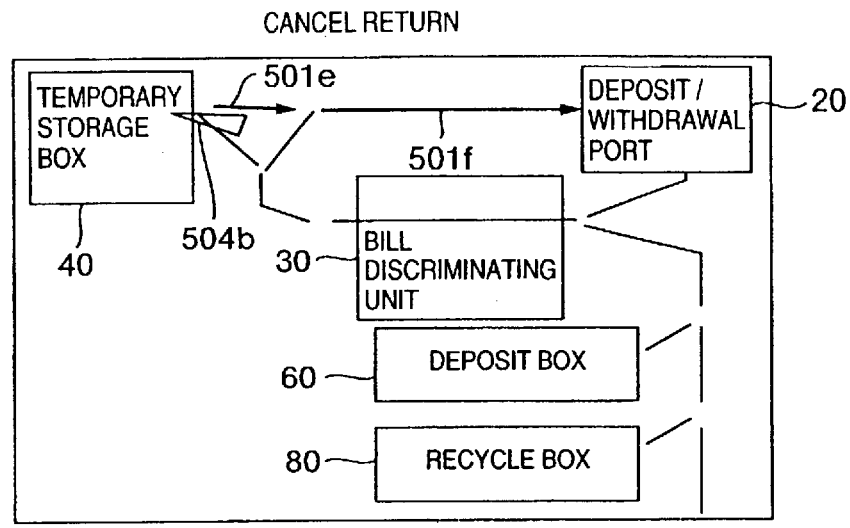
FIG. 9 is a schematic diagram of a bill transport path construction in a first embodiment of the present invention.

Operations of deposit transaction are classified into deposit count operation for counting bills deposited by the user as shown in FIG. 7 and deposit acceptance operation for accepting bills into individual accepting boxes associated with respective bill kinds after user's confirmation for a counted amount of money has been inputted. In the case where cancel is selected at the time of user's confirmation input, cancel return operation shown in FIG. 9 is performed.

At the time of deposit count operation (see FIG. 7), bills inputted to the deposit/withdrawal port 20 are separated one by one. The bill is transported as indicated by arrows 501a and 501b, and is subjected to the discrimination of the kind of the bill and the truth or falsehood thereof by the bill discriminating unit 30. As for a discriminated bill, a switching gate 503 is switched to 503a, and the bill is transported in a direction of arrows 501c and 501d and is temporarily accepted into the temporary storage box 40. Deposit-rejected bills including bills having resulted in the impossibility of discrimination by the bill discriminating unit 30 and bills having abnormal inclination thereof or abnormal interval between them are not taken into the temporary storage box 40, but transported through the switching gate 503 switched to 503b and through a route of arrow 501f and accepted into the deposit/withdrawal port 20 for return to a user.

At the time of deposit acceptance (see FIG. 8), the rotary drum 401 is rotated in a direction reverse to that at the time of acceptance into the temporary storage box 40. Bills wound around the rotary drum 401 are delivered in a direction reverse to that at the time of acceptance into the temporary storage box 40 as indicated by arrow 501d, in a sequence reverse to that at the time of acceptance into the temporary storage box 40. The bills are then transported as indicated by arrows 501c and 501b, passed through the bill discriminating unit 30, and a switching gate 502 switched to a direction indicated by arrow 502b. The bills are passed through 501g, 501h, and 901a, and accepted into a specified accepting box through a switching gate 903 of one of the deposit box 60, the recycle box 80, and the reject box 90 switched to a direction indicated by arrow 903b. At this time, an accepting box may be specified by discriminating the kind and the truth or falsehood of the bills in the bill discriminating unit 30 again. Alternatively, it is possible to provide a means for storing results of discrimination of all bills when accepting them into the temporary storage box 40 at the time of the deposit count and specify an accepting box on the basis of the stored contents. In the latter case, the processing time required to specify the accepting box can be shortened, and the portion of the arrows 501g, 501h, and 901a can be shortened.

At the time of cancel return (see FIG. 9), the rotary drum 401 is rotated in a direction reverse to that at the time of acceptance into the temporary storage box 40. The switching gate 504 is switched to a direction indicated by 504b. Bills wound around the rotary drum 401 are transported as indicated by arrows 501e and 501f, in a sequence reverse to that at the time of acceptance into the temporary storage box 40. The bills are then accepted into the deposit/withdrawal port 20 for return to the user.

Figure 10:
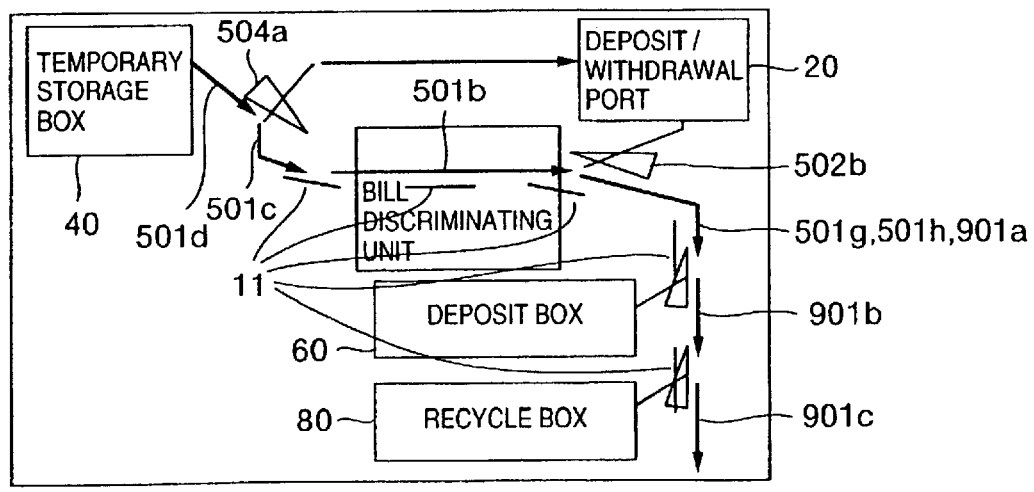
FIG. 10 is a schematic diagram of a bill transport path construction in a first embodiment of the present invention.
Figure 11:
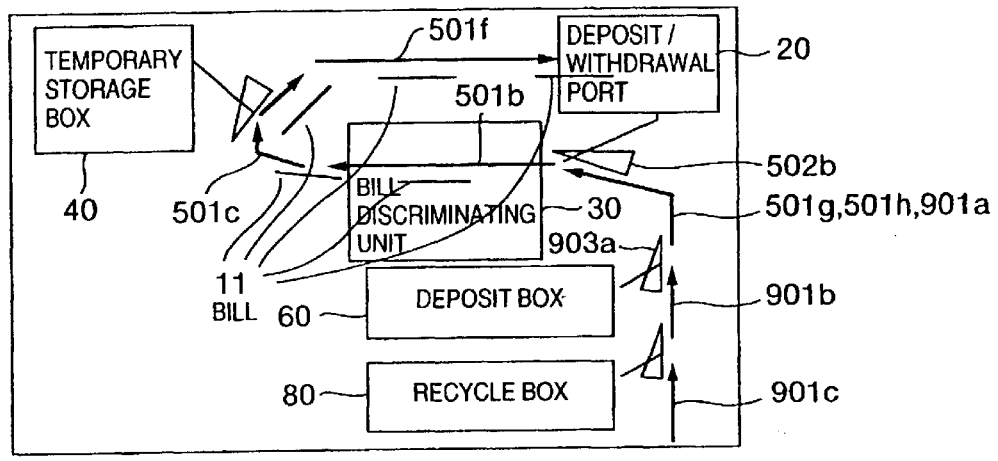
FIG. 11 is a schematic diagram of a bill transport path construction in a first embodiment of the present invention.
Figure 12:
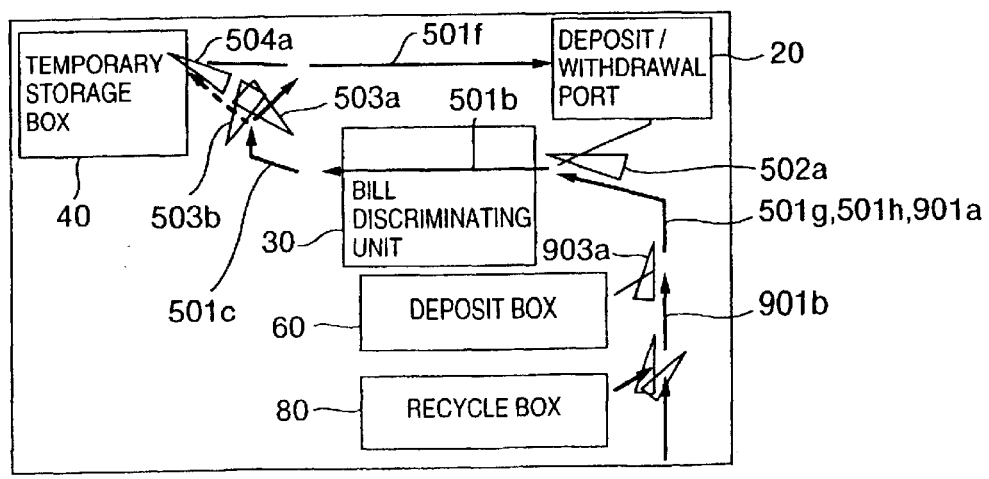
FIG. 12 is a schematic diagram of a bill transport path construction in a first embodiment of the present invention.

Alternatively, instead of providing the switching gate 504 and the portion of the bill transport path indicated by the arrow 501e, a construction shown in FIGS. 10 and 11 may be used. In other words, as a first stage, the bill transport path is stopped in such a stage that the bills are delivered from the temporary storage box 40 onto portions of the bill transport path indicated by arrows 501c, 501b, 501g, 501h and 901a to 901e as shown in FIG. 10. As a second stage, the bill transport path is reversed as shown in FIG. 11, and the bills are accepted into the deposit/withdrawal port 20 through a route indicated by arrows 901e to 901a, 501h, 501g, 501b, 501c, and 501f. When the deposited bills are large in number, it is also possible to repeat the operations of the first and second stages and return the deposited bills to the user. As a result, the bill transport path can have a simpler construction.

At the time of withdrawal transaction (see FIG. 12), bills are delivered out of a bill box for each bill kind in the withdrawal box 70 (omitted in FIG. 12) and the recycle box 80 by predetermined numbers, transported through a route of arrows 901e, 901d, 901c, 901b, 901a, 501h and 501g, and subjected to the bill kind discrimination by the bill discriminating unit 30. Thereafter, the bills are branched at the switching gate 503, accepted into the deposit/withdrawal port 20, and paid to the user. In the case where a withdrawal rejection caused by impossibility of discrimination in the bill discriminating unit 30 is generated, the corresponding bills are temporarily accepted into the temporary storage box 40 through the switching gate switched to a direction indicated by 503a in the same way as the deposit count. Bills corresponding to the shortage are additionally delivered from the withdrawal box 70 and/or the recycle box 80.

Figure 13:
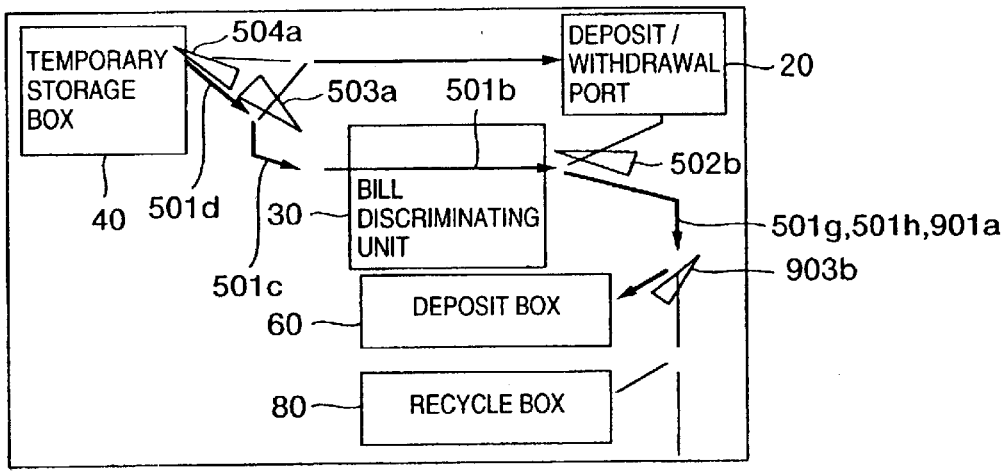
FIG. 13 is a schematic diagram of a bill transport path construction in a first embodiment of the present invention.

In the case where a reject occurs at the time of withdrawal transaction and bills are accepted into the temporary storage box 40, withdrawal reject acceptance operation shown in FIG. 13 is performed. In the present embodiment, all of the withdrawal reject bills in the temporary storage box 40 are accepted into the deposit box 60 as illustrated. Alternatively, the withdrawal reject bills are subjected to discrimination as to bill kind and truth or falsehood again when they are passed through the bill discriminating unit 30, and bills which can be discriminated and which belong to such bill kinds as to be able to be accepted into the recycle box 80 are accepted into the recycle box 80. By doing so, the number of rejected bills can be reduced, and the fund efficiency can be improved.

Further, although not illustrated, in the case where the user forgets to take out bills in the deposit/withdrawal port 2, the transaction may be discontinued under the judgment of the machine as being abnormal while the bills are left in the deposit/withdrawal port 2 as they are. In the present embodiment, however, the continuation of the succeeding transaction is contemplated by separating the forgotten bills from the deposit/withdrawal port 2, subjecting them to the discrimination in a manner similar to that at the time of deposit transaction and accepting them into the deposit box 60.

As shown in schematic diagrams of FIGS. 23 to 26, load and recovery operations can be performed, in the present embodiment, for the recycle box 80 by use of the load/recovery box 81 through the temporary storage box 40.

Figure 23:
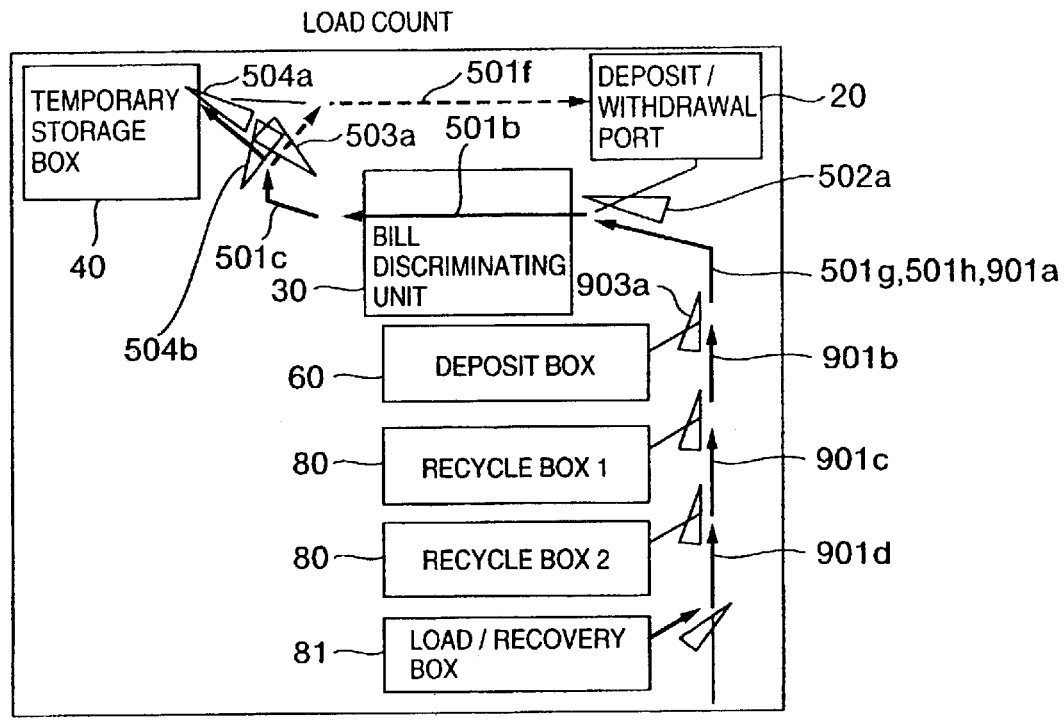
FIG. 23 is a schematic diagram showing a bill flow at the time of load count in an embodiment of the present invention.
Figure 24:
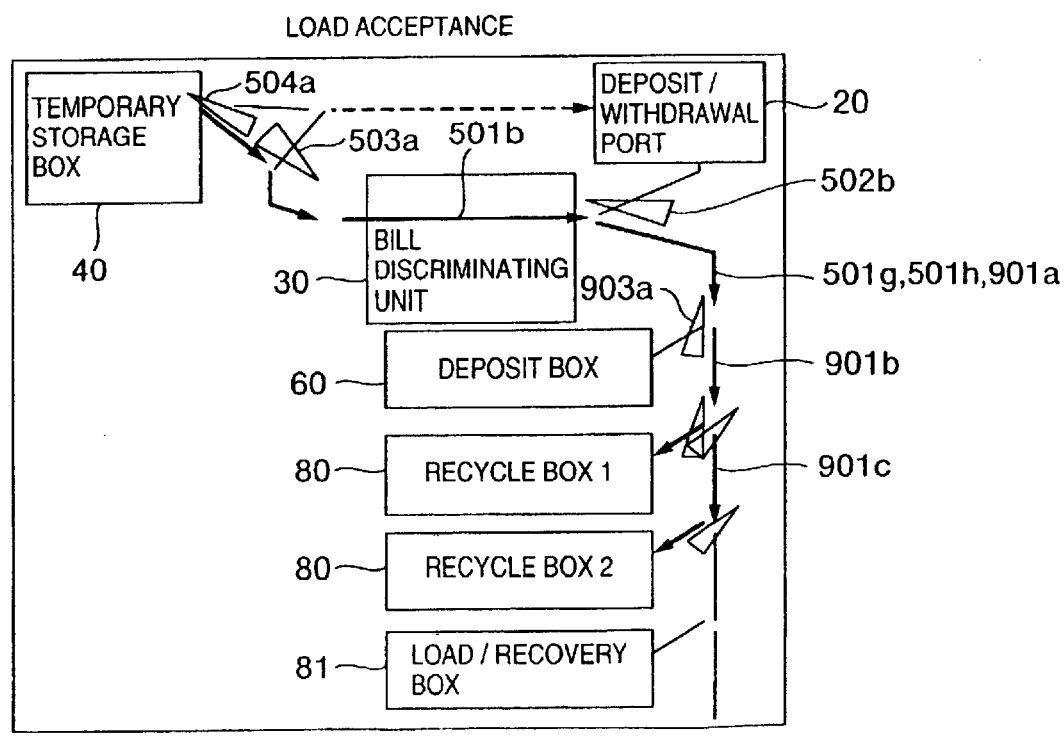
FIG. 24 is a schematic diagram showing a bill flow at the time of load acceptance in an embodiment of the present invention.

The load operation is such an operation that a clerk in charge does not set required bills individually into the recycle boxes 80 according to bill kind, but the clerk in charge sets bills en bloc into the load/recovery box 81 and the set bills are accepted into the recycle boxes 80 automatically in the machine. First, load count operation is performed as shown in FIG. 23. In the load count operation, bills delivered from the load/recovery box 81 are subjected to the discrimination of the bill kind by the bill discriminating unit 3 through a route indicated by arrows 901d to 901a, 501h, 501g, and 501b, and are accepted temporarily into the temporary storage box 40 through the switched switching gate 503. Subsequently, load acceptance operation is performed as shown in FIG. 24. In the load acceptance operation, the bills are discharged from the temporary storage box 40 one after another, transported through the same bill transport path in the reverse direction, and accepted into specified recycle boxes 80 according to the bill kind. In the case where the number of bills set en bloc into the load/ recovery box 81 is larger than the number of bills which can be accepted into the temporary storage box, the load count operation and the load acceptance operation are repeated. Furthermore, load rejected bills which cannot be kind-settled are accepted into the deposit/withdrawal port 20 through the switching gate 503 switched to a direction indicated by 503b and through 501f. After the acceptance operation of all loaded bills has been finished, the bills accepted into the deposit/withdrawal 20 are accepted into the load/recovery box 81 by operation similar to the operation performed at the time of deposit transaction. Alternatively, the bills accepted into the deposit/withdrawal 20 may be accepted into the deposit box 60 as rejected bills.

Figure 25:
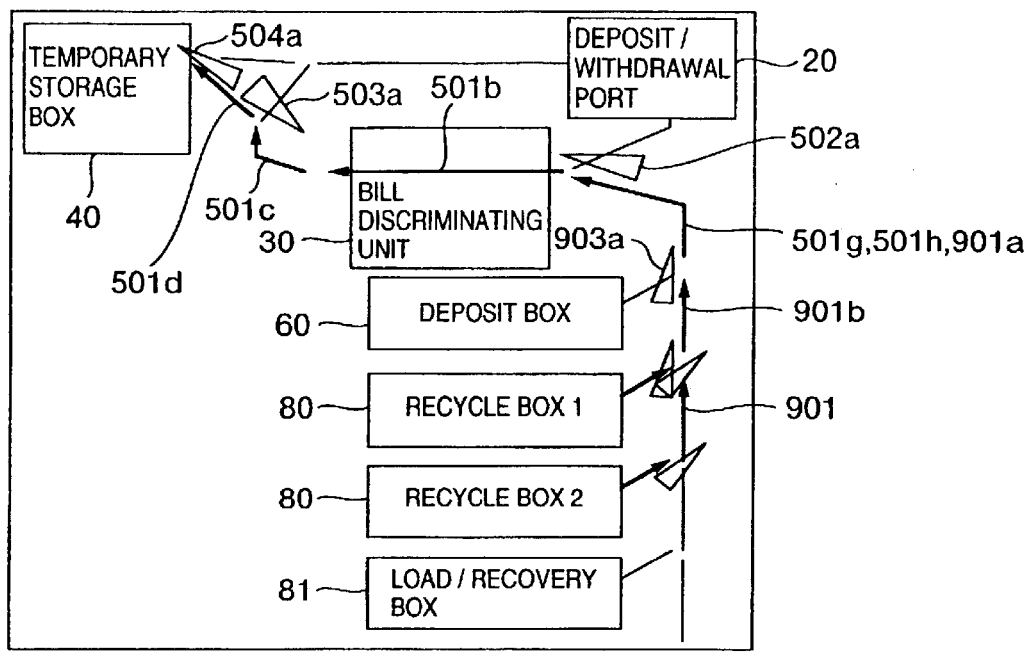
FIG. 25 is a schematic diagram showing a bill flow at the time of recovery count in an embodiment of the present invention.
Figure 26:
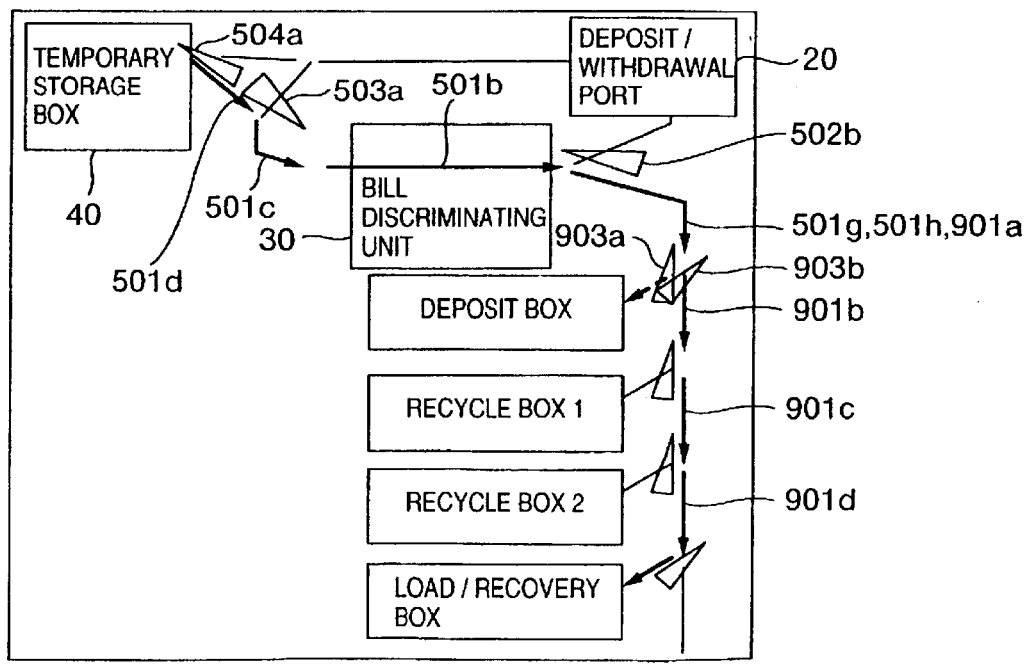
FIG. 26 is a schematic diagram showing a bill flow at the time of recovery acceptance in an embodiment of the present invention.

The recovery operation is an operation in which for example, when the recycle box 80 becomes fill, a clerk in charge does not extract bills individually from the recycle box, but a predetermined number of bills are automatically recovered from the recycle box 80 and accepted into the load/recovery box 81. The recovery operation is an operation in which bills are moved through a route reverse to that of the load operation. Bills delivered out of the recycle box 80 are temporarily accepted into the temporary storage box 40 as shown in FIG. 25, and are thereafter recovered from the temporary storage box 40 to the load/recovery box 81 as shown in FIG. 26. Bills rejected in the recovery count operation shown in FIG. 25 or the recovery acceptance operation shown in FIG. 26 for the reason, for example, that the bill kind cannot be discriminated are accepted into the deposit box 60 through the switching gate switched to a direction of 903b in the recovery acceptance operation of FIG. 26. Detailed description thereof will be omitted.

<Second Embodiment>

Figure 27:
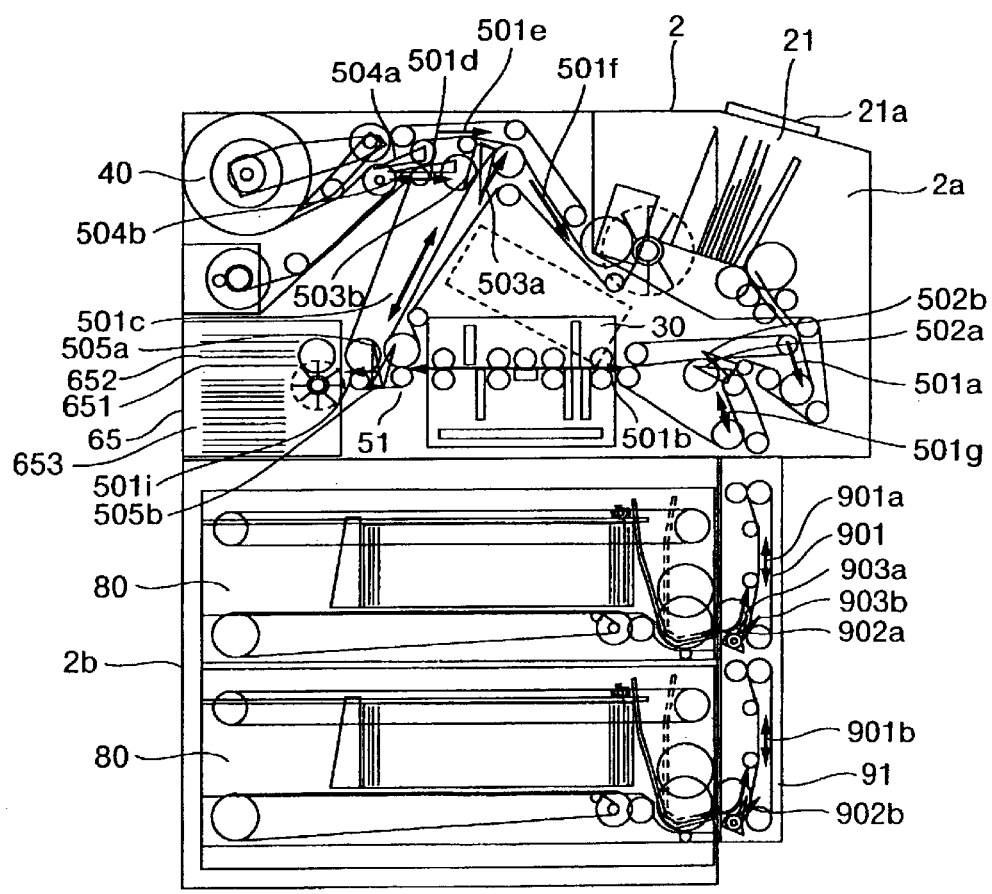
FIG. 27 is a side view showing a second embodiment of a bill deposit/withdrawal machine according to the present invention.
Figure 28:
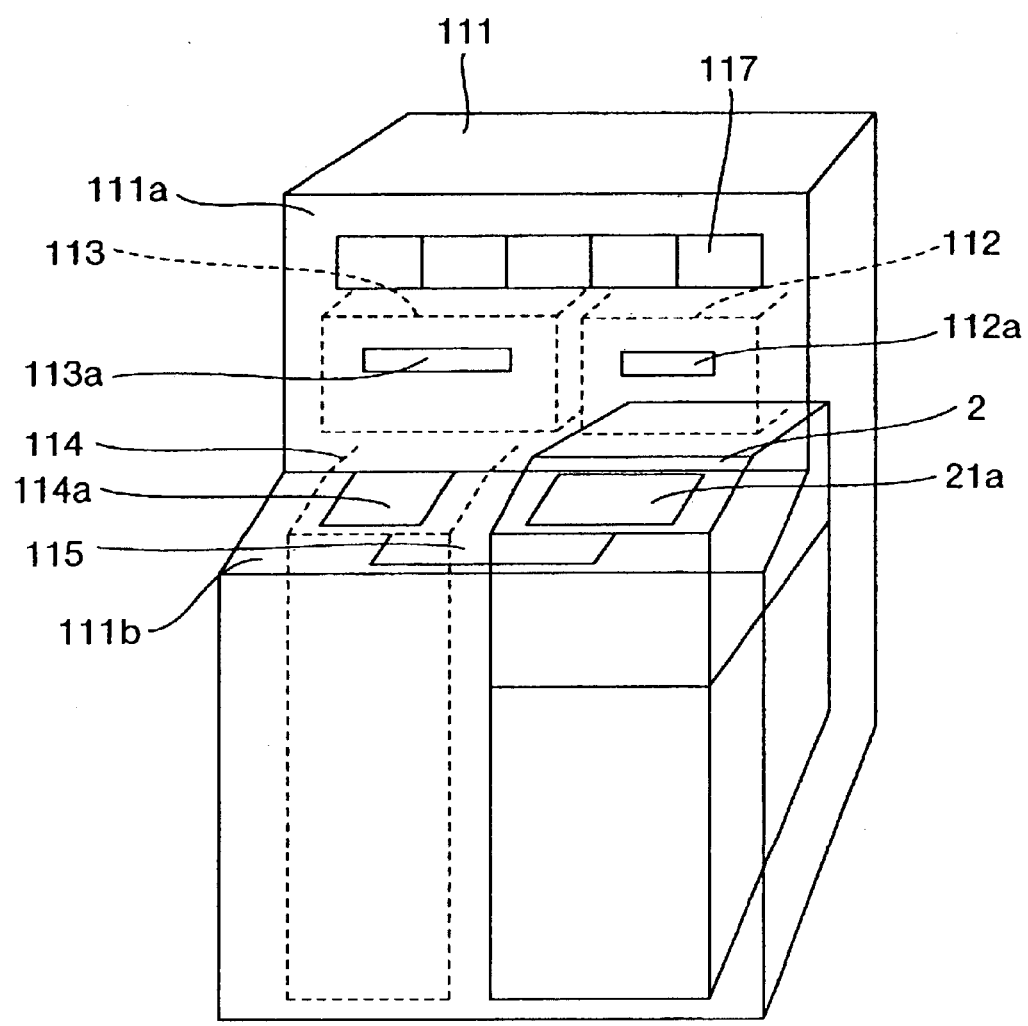
FIG. 28 is an oblique view showing an exterior view of an embodiment of an automated teller machine to which a second embodiment of the present invention is applied.
Figure 29A:
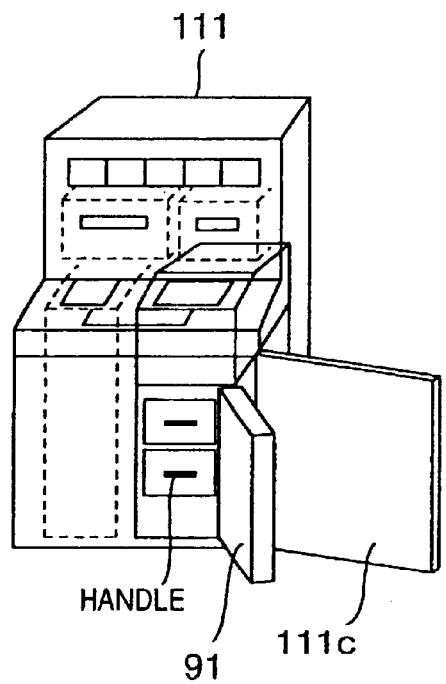
FIGS. 29A and 29B are diagrams showing operation methods of the automated teller machine shown in FIG. 28.
Figure 29B:
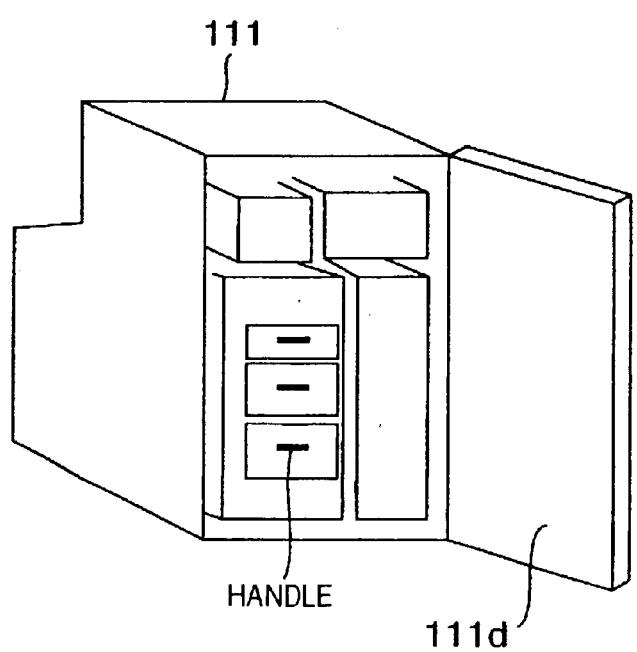
Figure 30A:
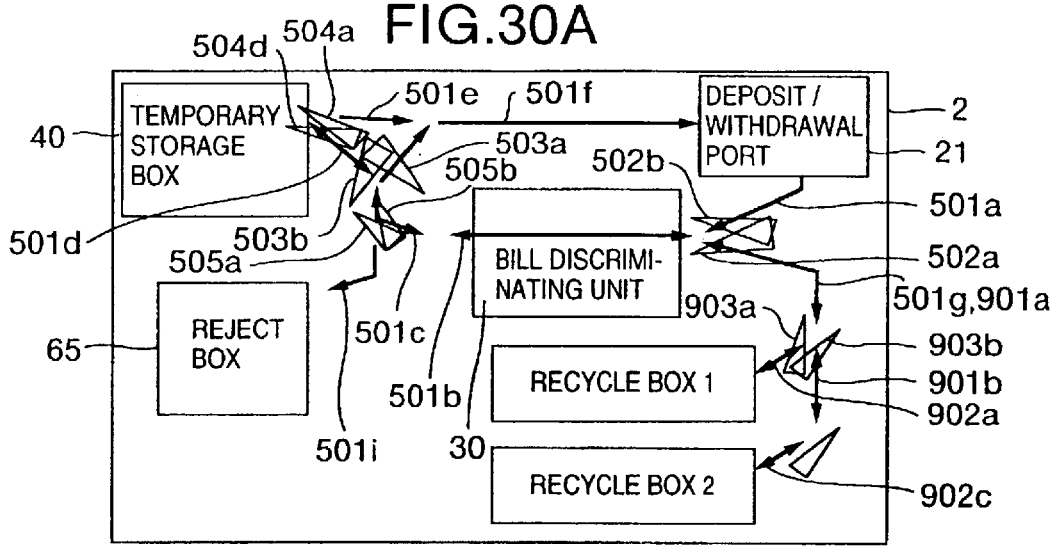
FIGS. 30A, 30B and 30C are schematic diagrams of a bill transport path construction in a second embodiment of the present invention.
Figure 30B:
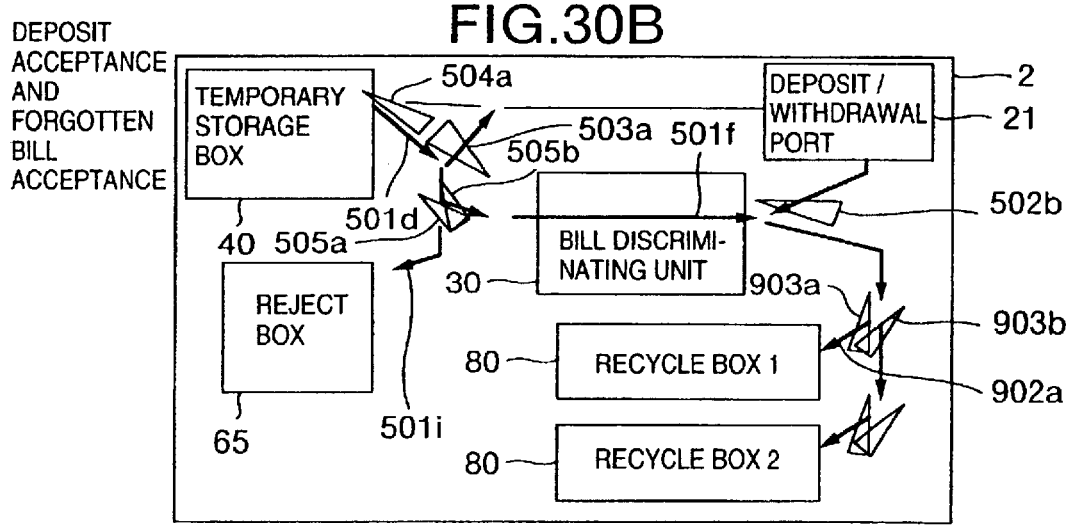
Figure 30C:
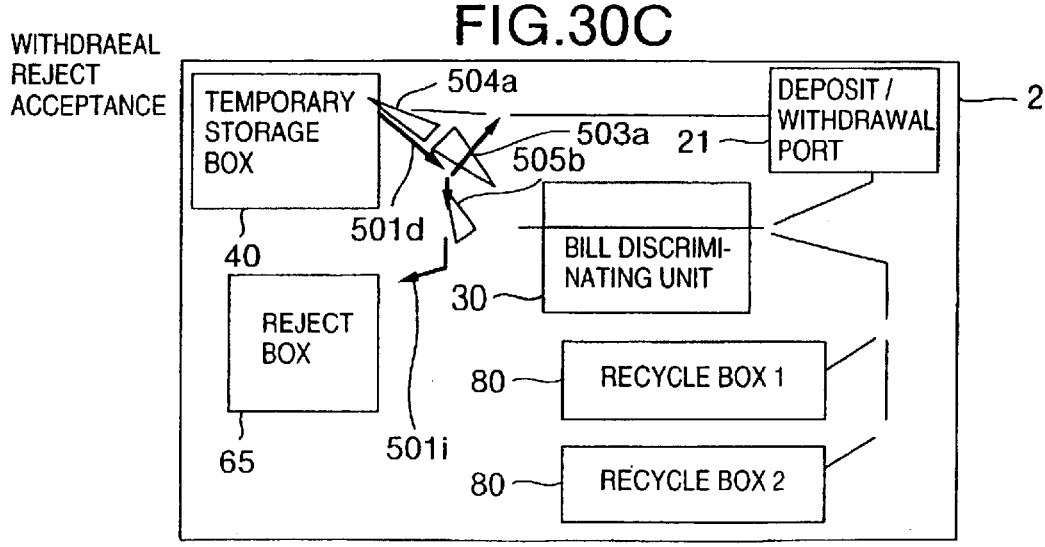

A second embodiment of the present invention will now be described by referring to FIG. 27 showing a side view of a bill deposit/withdrawal machine, FIG. 28 showing an exterior view of an automated teller machine, FIGS. 29A and 29B showing operation methods of the automated teller machine, and FIGS. 30A, 30B and 30C which are schematic diagrams showing bill flows.

In FIG. 27, numeral 2 denotes a bill deposit/withdrawal machine, 2a an upper transport mechanism, 2b a lower bill mechanism, 21 a deposit/withdrawal port, 65 a reject box, 651 a partition plate, 652 an upper accepting space, 653 a lower accepting space, and 91 an openable and closable transport path. In FIG. 28, numeral 111 denotes an automated teller machine, 111a a front plate, 111b a table face, 112 a card/slip processing mechanism, 112a a card slot, 113 a passbook processing mechanism, 113a a passbook slot, 114 a coin deposit/withdrawal mechanism, 114a a coin slot, 115 a customer operation unit, 2 a bill deposit/withdrawal machine, and 21 a bill slot. In FIGS. 29A and 29B, character 111c denotes a front door, and 111d denotes a back door. Components having the same function as those of the first embodiment are denoted by like reference characters.

The second embodiment differs from the above described first embodiment mainly in that (a) the deposit/withdrawal port 21 is installed so as to make the face of the bill slot 21a nearly horizontal, (b) the lower bill mechanism 2b is composed of two recycle boxes 80 and the openable and closable transport path 91, and (c) the reject box 65 is provided instead of the deposit box.

Hereafter, features of the present embodiment will be described in more detail laying stress on the above described points of difference. (Other constructions and operations are considered to be easily understood from the description of the first embodiment. Therefore, detailed description thereof will be omitted.)

(1) In the present second embodiment, the deposit/withdrawal port 21 is installed so as to make the bill slot 21a nearly horizontal. The reason for this is that the present bill deposit/withdrawal machine 2 is mounted on the automated teller machine 111 shown in FIG. 28. An upper portion of the automated teller machine ill is provided with the card/slip processing mechanism 112 which communicates with the card slot 112a provided in the upper front plate 111a to process a user's card and print and deliver a transaction particulars slip, the passbook processing mechanism 113 which communicates with the passbook slot 113a to process a user's passbook, and a transaction display unit 117. A lower portion of the automated teller machine 111 is provided with the bill deposit/withdrawal mechanism 2 for processing bills, and the coin deposit/withdrawal mechanism 114 for processing coins. The user operation face 111b located in an intermediate portion is provided with a customer operation section 115 for displaying and inputting the contents of a transaction, the bill slot 21a, and the coin slot 114a. This automated teller machine 111 can perform processing of user's deposit, withdrawal and transfer by using a card, a passbook, bills, coins, and a slip as media.

As for the construction of the deposit/withdrawal port 21, the deposit/withdrawal port 20 and the shutter mechanism forming the shutter 201 shown in FIG. 14 of the first embodiment are changed in arrangement angle. In addition, a mechanism for inclining the bill hopper 216 to the horizontal direction by rotary operation is mounted in the first embodiment. In the deposit/withdrawal port 21, however, the rotary operation mechanism of the bill hopper 216 is eliminated and the bill hopper is fixed.

(2) The second embodiment has a structure divided into an upper part 2a and a lower part 2b in the same way as the first embodiment. However, the lower bill mechanism 2b is composed of two recycle boxes 80 and the openable and closable transport path 91. The bill deposit/withdrawal machine of the second embodiment is mounted on the automated teller machine 111 shown in FIG. 28. According to the machine type, the bill deposit/withdrawal machine can be made front operation type or back operation type in the same way as the first embodiment. In the machine of front operation type in which a clerk in charge operates from the front face side of the machine as shown in FIG. 29A, the recycle boxes having respective handles appear as illustrated by opening the front door 111c of the automated teller machine 111 and further opening the openable and closable transport path 91 of the bill deposit/withdrawal machine 2. The clerk in charge can pull out the recycle box by using the handle, perform operations such as bill setting, and operates the openable and closable transport path 91 easily.

On the other hand, in the machine of back operation type in which a clerk in charge operates from the back face side of the machine as shown in FIG. 29B, the recycle boxes having respective handles appear as illustrated by opening the back door 111d of the automated teller machine 111. The clerk in charge can pull out the recycle box by using the handle, and perform operations easily.

By adopting the construction heretofore described, the bill supplementation and recovery operation and jammed bill removal operation are facilitated and the operability is improved.

In the present embodiment, the bill box casing is not provided, and consequently the upper transport mechanism 2a is placed directly on the lower bill mechanism.

(3) In accordance with (2), the openable and closable transport path 91 has a construction conformed to two recycle boxes, and has an openable and closable structure as shown in FIG. 29A.

(4) In the second embodiment, the deposit box 60 as used in the first embodiment is not provided. Instead, the reject box 65 is provided.

The reject box 65 of the present embodiment is smaller in accepting space than the deposit box 60 in the first embodiment. However, the reject box 65 has an upper accepting space 652 and a lower accepting space 653 separated by the partition plate 651. By switching a switching gate 505 to a state indicated by 505*b* as shown in FIG. 30A, non-returning bills and bills forgotten to take out which cannot be accepted into the recycle box 80 at the time of deposit acceptance can be accepted from the temporary storage box 40 into the reject box 65 as shown in FIG. 30B. (Bills which can be accepted into the recycle box 80 are accepted into the recycle box 80 by switching the switching gate 505 to a state of 505*a*.) In the same way, by switching the switching gate 505 to the state of 505*b*, bills rejected at the time withdrawal can be accepted from the temporary storage box 40 into the reject box 65 as shown in FIG. 30B. The partition plate 651 of the reject box 65 can be moved upward and downward by a driving source which is not illustrated. By moving control of the partition plate, for example, forgotten bills are accepted into the upper accepting space 652, whereas other rejected bills and non-returning bills are accepted into the lower accepting space 653. As a result, strict management of cash becomes possible.

Features of the constructions of the first and second embodiments heretofore described and effects obtained therefrom will now be described.

(1) The deposit/withdrawal port and the bill discriminating unit are disposed in the upper part of the bill deposit/withdrawal machine, and the bill accepting boxes are disposed in the lower part of the bill deposit/withdrawal machine. Furthermore, the bill transport path is also constructed so as to be able to be divided into the upper mechanism part and the lower mechanism part. The transport path of the lower part is disposed near the wall face of user's operation side. In a horizontal plane separating the upper part from the lower part, the mechanisms do not cross. Therefore, the upper part and the lower part can be separated by the horizontal plane. The upper part and the lower part may be mounted on one machine casing. The lower part accepting bills may be mounted on a further rigid bill box casing. Thus, a construction required to have higher security can also be provided. Since the transmission path of the lower part is disposed near the wall face of user's operation side, both the front operation type in which a clerk in charge can operate from the front face and the back operation type in which a clerk in charge can operate from the back face can be easily constructed. There is universality capable of coping with various needs such as operability, installation place, and security.

(2) In the present embodiments, the upper transport mechanism and the lower transport mechanism are provided separately. Bills before materialization of a transaction such as bills at the time of deposit count exist only in the upper transport mechanism. Even if a jam has occurred in the bills, therefore, it becomes unnecessary to open the bill box surrounding the lower bill mechanism and consequently the security can be maintained. Furthermore, there is an effect that bills owned by a user (bills existing in the upper transport mechanism) and bills owned by the bank (bills existing in the lower bill mechanism) can be distinguished definitely.

(3) Such a bill deposit/withdrawal machine that accepting boxes can be attached and detached from either of the front side and the back side is implemented. A common structure can be applied both the machine of front operation type and the machine of back operation type as shown respectively in FIGS. 5A, 29A and FIGS. 5B and 29B, resulting in high universality.

(4) The deposit/withdrawal ports 20 and 21 respectively of the first and second embodiments can provide a bill deposit/withdrawal machine which can be mounted on both the automated teller machine shown in FIG. 3 in which the user's input/discharge direction is nearly the vertical direction and the automated teller machine shown in FIG. 27 in which the user's input/discharge direction is nearly the horizontal direction. Thus automated teller machines having various specifications can be provided according to the user's operability.

(5) As for the temporary storage box, the winding system using the inducing tape is adopted. Furthermore, the temporary storage box performs not only the temporary storage of deposit bills but also the temporary storage of withdrawal rejected bills. As a result, a simple recycle box can be implemented as compared with the conventional machine having a temporary storage box in the recycle box. It is possible to cope with not only deposit transactions of many bill kinds but also easily cope with foreign bills differing largely in size as compared with the conventional machine owing to adoption of the winding system using the inducing tape. At the time of temporary storage of withdrawal rejected bills, the possibility of folded bills, broken bills, or an inclined transportation state is high. Such a machine that jam is hard to occur for them can be implemented.

The following variations are also possible.

(1) In the above described embodiments, the bill hopper of the deposit/withdrawal port is common. However, bill hoppers may be provided separately for the deposit port and the withdrawal port.

(2) In the above described embodiments, the winding type using the rotary drum (see FIG. 17) is adopted as the temporary storage box 40. However, a construction of stacking type as in the recycle box (see FIG. 22) described in the embodiment may also be adopted.

(3) In the above described embodiments, the openable and closable transmission path (90 in the first embodiment and 91 in the second embodiment) is provided so as to be common to all accepting boxes. However, openable and closable transmission paths may be provided for accepting boxes, respectively.

(4) In the above described embodiments, the driving source of the transportation path is one in number, and the transportation path 501*g*-501*h*-901*a* is coupled by gears. However, separate driving sources (motors) may be provided for the upper transport mechanism and the lower bill mechanism. In this case, a fault such as a coupling defect caused by gears is eliminated.

(5) In the above described embodiments, each accepting box has handles on both the front side and the back side. The lower bill mechanism (1*b* in the first embodiment or 2*b* in the second embodiment) is constructed so as to be able to be attached and detached from either of the front side and the back side. In this way, both the accepting boxes and the lower bill mechanism have constructions common to the machine of front operation type and the machine of back operation type. However, the accepting boxes and the lower bill mechanism may be dedicated either the machine of front operation type or the machine of back operation type. By doing so, the construction is simplified and the cost can be reduced.

A third embodiment of the present invention will now be described by referring to FIGS. 31 to 38.

Figure 31:
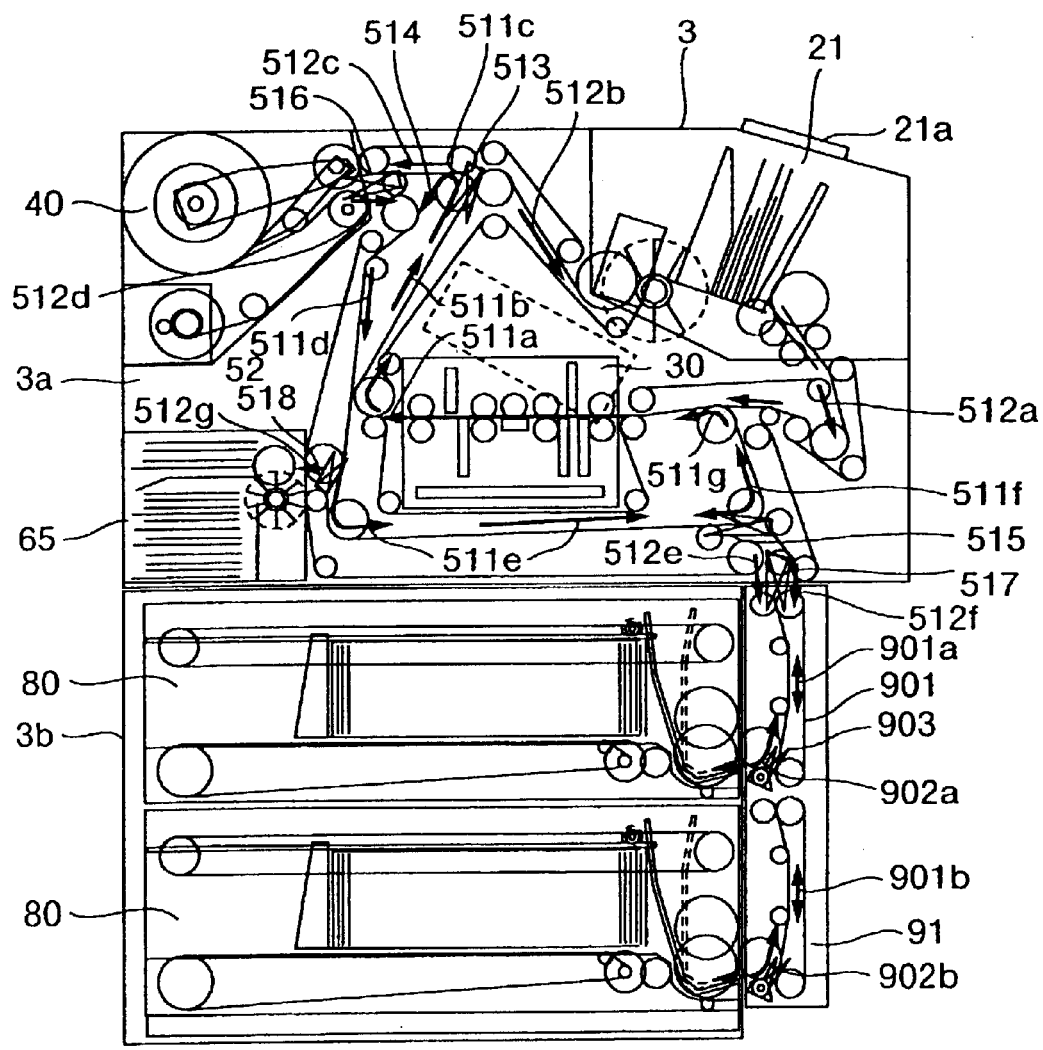
FIG. 31 is a side view showing a third embodiment of a bill deposit/withdrawal machine according to the present invention.

As shown in FIG. 31, a bill deposit/withdrawal machine 3 of the third embodiment has a construction composed of an upper transport mechanism 3a and a lower bill mechanism 3b which can be separated in the vertical direction in the same way as the first and second embodiments. In the upper transport mechanism 3a, a deposit/withdrawal port 21, a bill discriminating unit 30, a temporary storage box 40, and a reject box 65 are connected by a bill transport path 52.

The difference of the third embodiment from the second embodiment will now be described.

Figure 32:
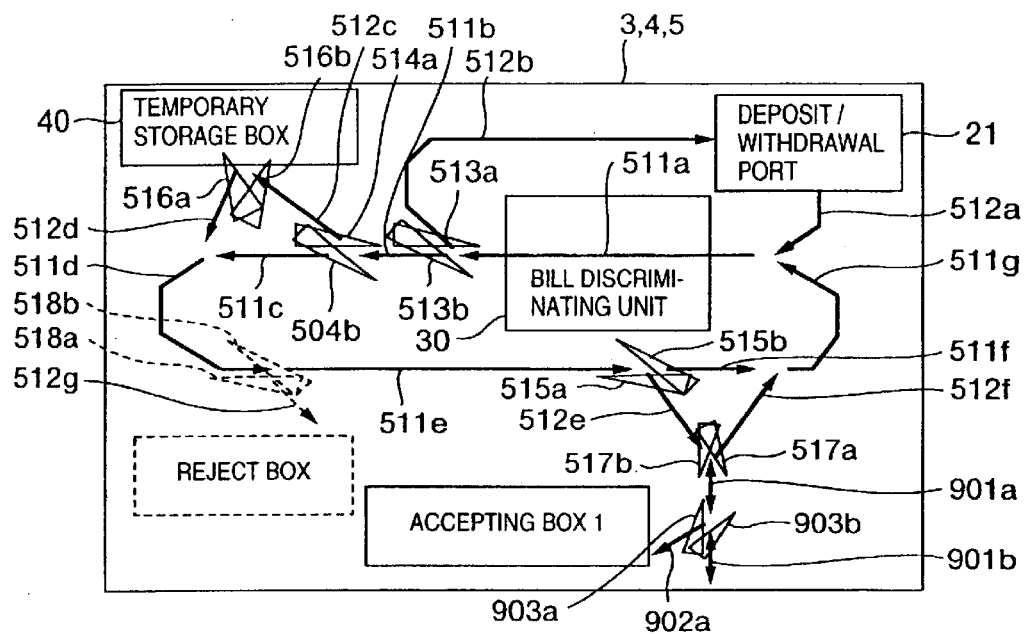
FIG. 32 is a schematic diagram of a bill transport path construction in a third embodiment of the present invention (construction diagram)

As shown in a schematic diagram of FIG. 32, the bill transport path 52 does not transport bills through the bill discriminating unit 30 in both directions, but transport bills through the bill discriminating unit 30 in only one direction indicated by arrow 511a. A ring-like main bill transport path 511 leaving the bill discriminating unit 30 and returning to the bill discriminating unit 30 through a route indicated by arrows 511b, 511c, 511d, 511e, 511f and 511g is constructed. In addition, a unit bill transport path 512 for connecting each unit to the main bill transport path 511 unidirectionally is provided. The unit bill transport path 512 is composed of a transport path from a delivery port of the deposit/withdrawal port 21 to the main bill transport path 511 (indicated by arrow 512a), a transport path from the main bill transport path 511 to an acceptance port of the deposit/withdrawal port 21 (indicated by arrow 512b), a transport path from the main bill transport path 511 to an acceptance port of the temporary storage box 40 (indicated by arrow 512c), a transport path from a delivery port of the temporary storage box 40 to the main bill transport path 511 (indicated by arrow 512d), a transport path from the main bill transport path 511 to a lower bill transport path 901 (indicated by arrow 512e), a transport path from the lower bill transport path 901 to the main bill transport path 511 (indicated by arrow 512f), and a transport path from the main bill transport path 511 to the reject box 65 (indicated by arrow 512g). The lower bill transport path 901 is a bidirectional transport path. Furthermore, at branch points of the main bill transport path 511 and respective unit bill transport path 512a to 512g, switching gates 513, 514, 515, 516, 517, and 518 are mounted. (Suffix "a" and "b" indicate the states of the switching gate.)

FIGS. 33 to 38 are diagrams showing the flow of bills transported on the bill transport path shown in FIG. 32 according to the content of the transaction.

Figure 33:
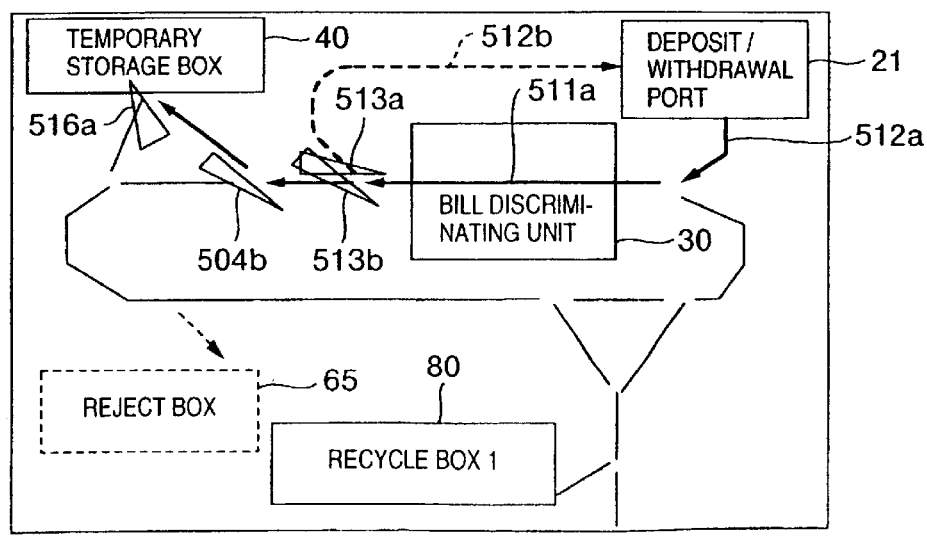
FIG. 33 is a schematic diagram of a bill transport path construction in a third embodiment of the present invention (at the time of deposit count)

FIG. 33 is a schematic diagram showing the bill flow at the time of deposit count. Bills from the deposit/withdrawal port 21 are passed through the bill discriminating unit 30. On the basis of the result of the discrimination, the bills are passed through the switching gates 513a, 514b and 516a and accepted into the temporary storage box 40, or returned to the deposit/withdrawal port 21 through the switching gate 513b.

Figure 34:
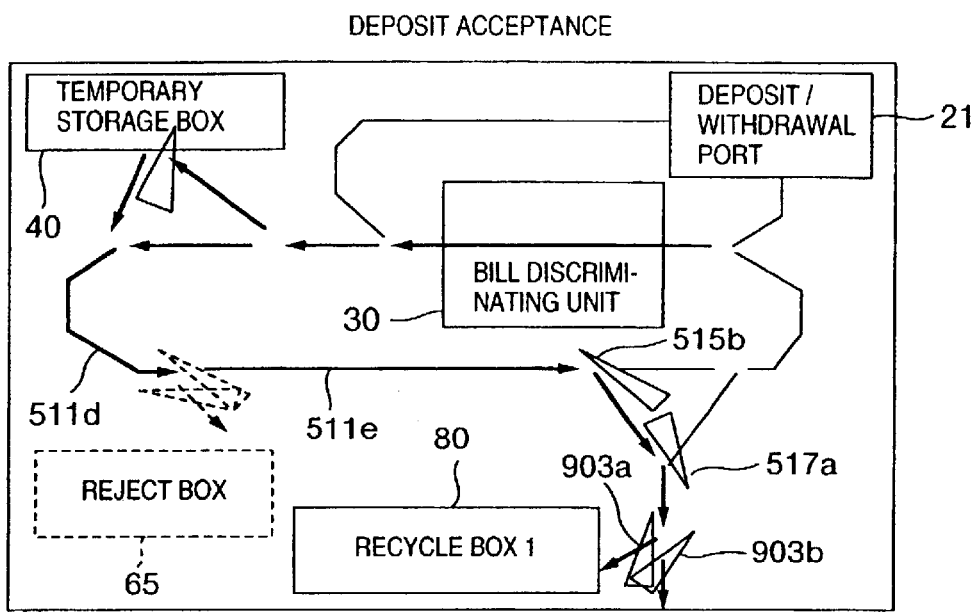
FIG. 34 is a schematic diagram of a bill transport path construction in a third embodiment of the present invention (at the time of deposit acceptance)

FIG. 34 is a schematic diagram showing the bill flow at the time of deposit acceptance. According to the result of the discrimination performed at the time of deposit count, bills from the temporary storage box are accepted into the recycle box 80 or accepted into the reject box.

Figure 35:
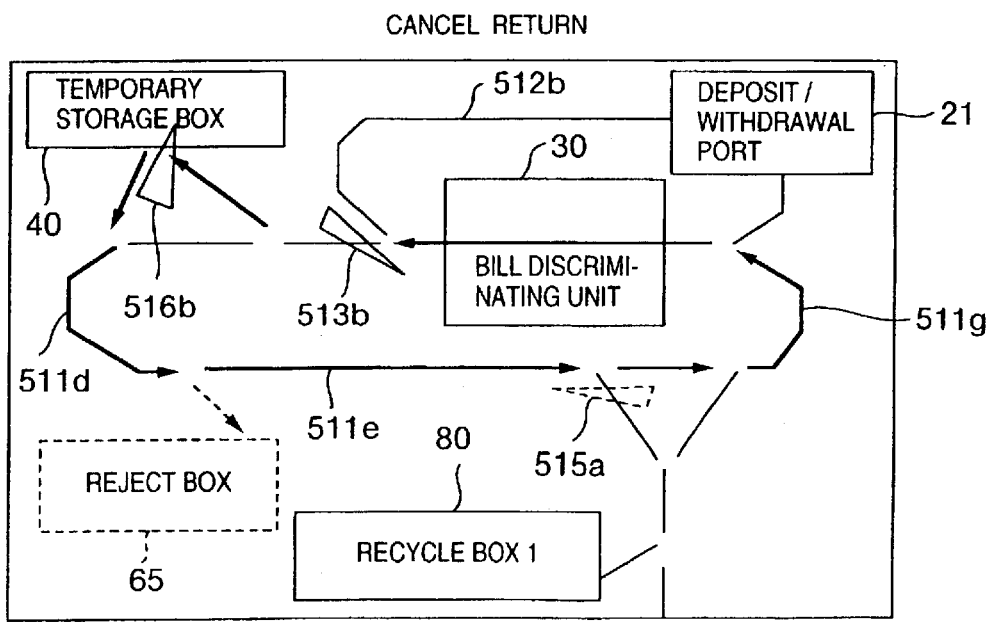
FIG. 35 is a schematic diagram of a bill transport path construction in a third embodiment of the present invention (at the time of cancel return)

FIG. 35 is a schematic diagram showing the bill flow at the time of cancel return. Bills from the temporary storage box 40 are returned to the reject box 65 or to the deposit/withdrawal port 21 through the bill discriminating unit 30.

Figure 36:
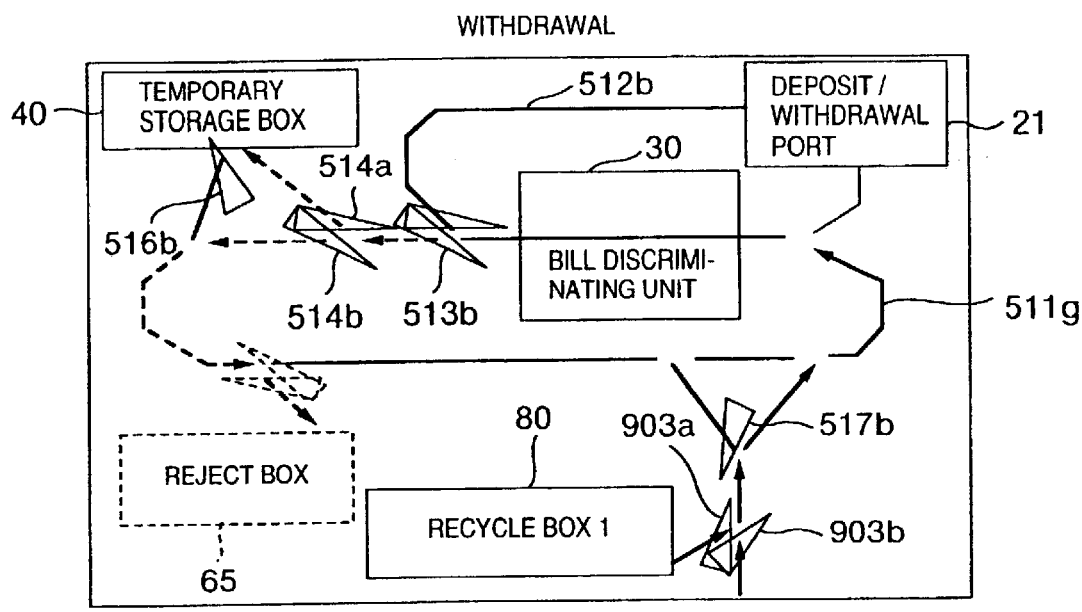
FIG. 36 is a schematic diagram of a bill transport path construction in a third embodiment of the present invention (at the time of withdrawal)

FIG. 36 is a schematic diagram showing the bill flow at the time of withdrawal. Bills from the recycle box are subjected to discrimination in the bill discriminating unit 30, and then transported to the deposit/withdrawal port 21 for withdrawal, accepted in the temporary storage box 40, or accepted into the reject box 65.

Figure 37:
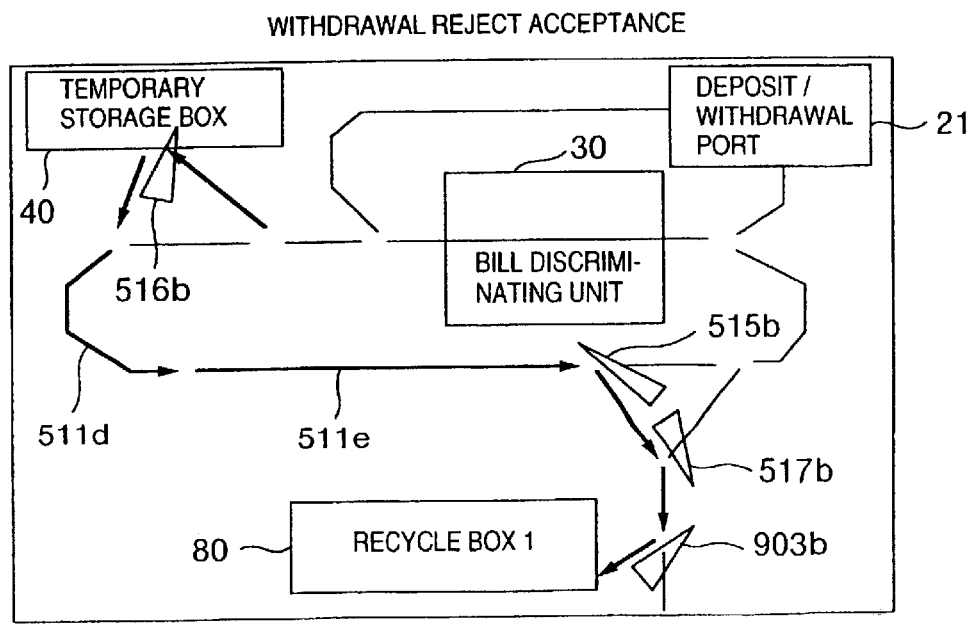
FIG. 37 is a schematic diagram of a bill transport path construction in a third embodiment of the present invention (at the time of withdrawal reject acceptance)

FIG. 37 is a schematic diagram showing the bill flow at the time of withdrawal reject acceptance. Bills from the temporary storage box 40 are accepted into the recycle box 80.

Figure 38:
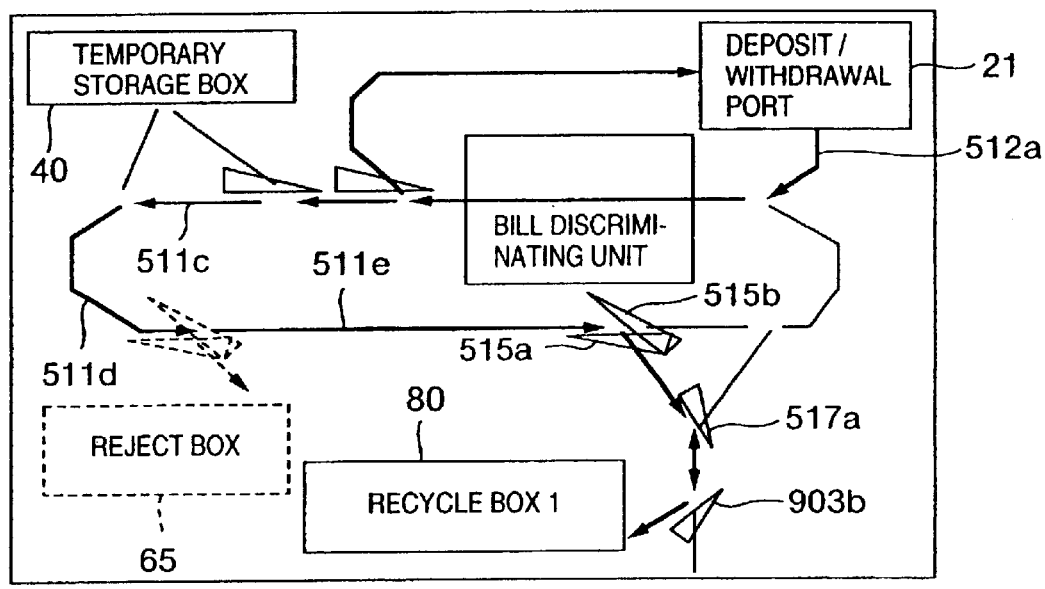
FIG. 38 is a schematic diagram of a bill transport path construction in a third embodiment of the present invention (at the time of recovery for forgotten takeout)

FIG. 38 is a schematic diagram showing the bill flow at the time of forgotten bill recovery. Forgotten bills from the deposit/withdrawal port 21 are passed through the bill discriminating unit 30, and accepted into the recycle box 80 or accepted into the reject box 65.

In the third embodiment, bills are not transported through the bill discriminating unit 30 bidirectionally. The ring-like main bill transport path 511 transport bills through the bill discriminating unit 30 unidirectionally. The lower bill transport path is composed of a bidirectional bill transport path. Thus the transport path construction is simple, and a highly reliable machine which is low in possibility of bill jam can be provided. In other words, in user's deposit transactions, various users might input a folded or broken bill to the deposit port or input a coin or an alien substance together with bills to the deposit port by mistake. When delivering such a bill, it might incline largely or be broken. Depending upon the transport state, there is not a little possibility of jam occurrence in the bill transport path. Furthermore, in a machine capable of handling foreign bills as well, not only the number of bill kinds increases as compared with the case of Japanese yen bills, but also the size of bills largely differ in both the longitudinal and lateral directions according to the bill kind in many cases. There is a possibility of a large number of bills inputted to the deposit port being largely disturbed in evenness. Furthermore, as for the degree of fold and breaking of bills, there are bills in conditions worse than those of Japanese yen bills, when seen from the circulating situation of bills in various countries. When handling bills of such bad conditions, the bill transport path 50 has high reliability against the bill jam because of its simple construction of the bill guide plane.

Figure 39:
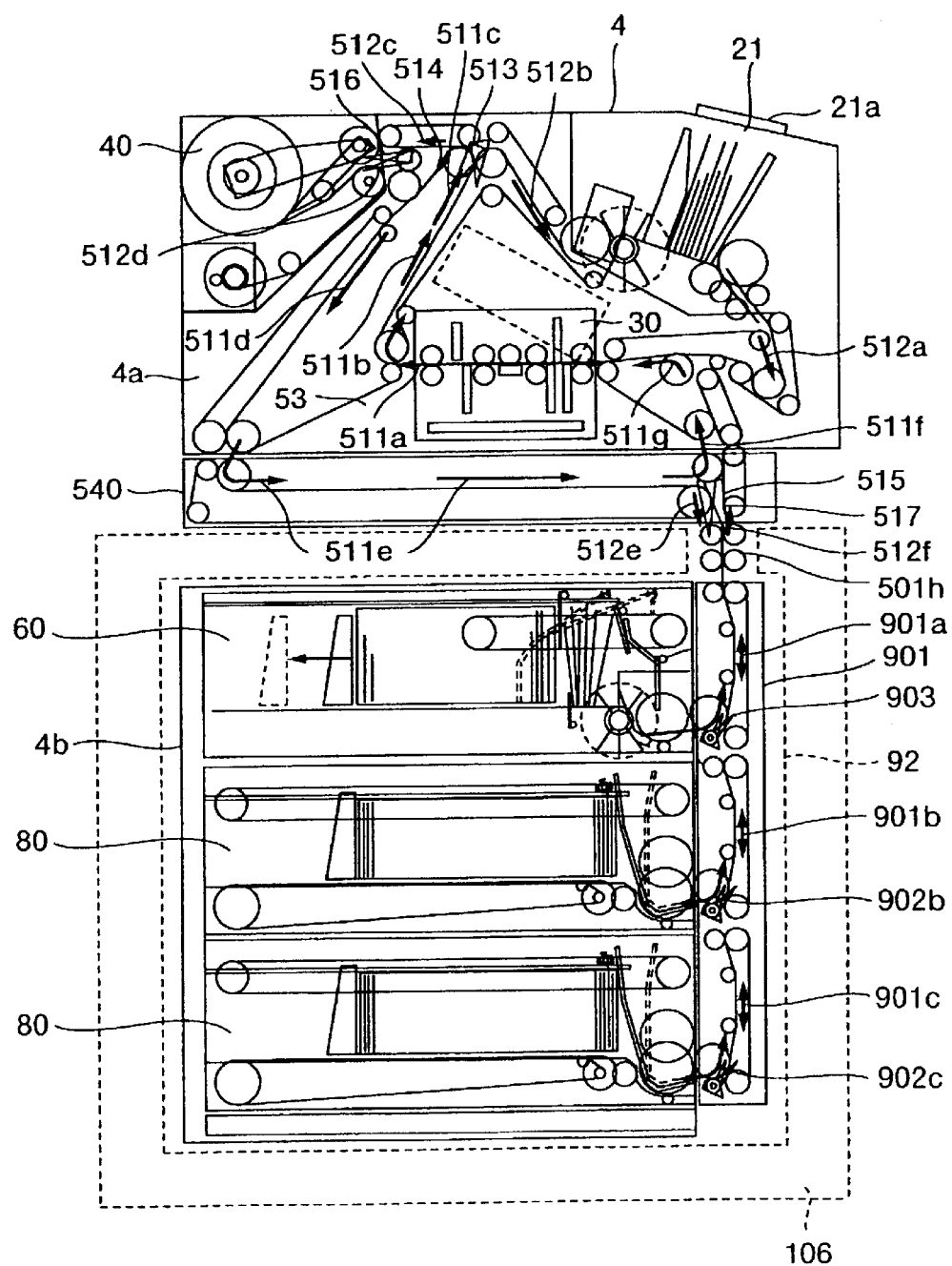
FIG. 39 is a side view showing an operation method of a fourth embodiment of a bill deposit/withdrawal mechanism according to the present invention.
Figure 40:
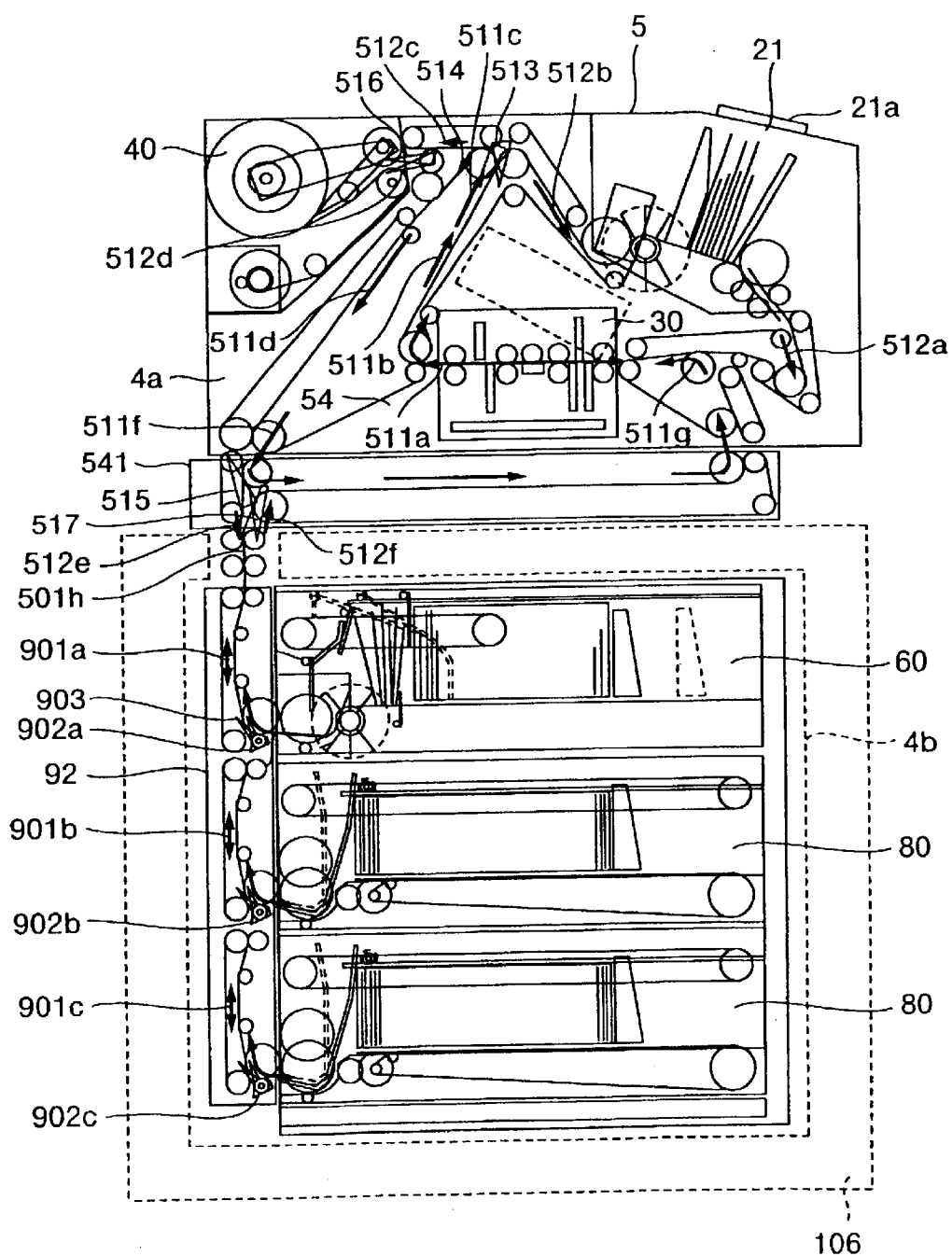
FIG. 40 is a side view showing another operation method of a fourth embodiment of a bill deposit/withdrawal mechanism according to the present invention.

A fourth embodiment of the present invention will now be described by referring to FIGS. 39 and 40.

As for the construction of a bill transport path 53, the fourth embodiment has the construction shown in the schematic diagram of FIG. 32 in the same way as the third embodiment. The fourth embodiment differs from the third embodiment in that connection bill transport paths 540 or 541 is constructed between an upper transport mechanism 4a and a lower bill mechanism 4b of a bill deposit/withdrawal machine 4 or 5.

The bill deposit/withdrawal machine of the fourth embodiment is mounted on the automated teller machine 101 as shown in FIG. 1. In the machine of back operation type as shown in FIG. 5B, the bill deposit/withdrawal machine 4 shown in FIG. 39 is used. In the machine of front operation type as shown in FIG. 5A, the bill deposit/withdrawal machine 5 shown in FIG. 40 is used. In the bill deposit/withdrawal machine 4 shown in FIG. 39, the connection bill transport path 540 is provided between the upper transport mechanism 4a and the lower bill mechanism 4b. In the bill deposit/withdrawal machine 5 shown in FIG. 40, the connection bill transport path 541 is provided between the upper transport mechanism 4a and the lower bill mechanism 4b. The upper transport mechanism 4a and the lower bill mechanism 4b of FIG. 40 are the same as those of FIG. 39. However, the lower bill mechanism 4b of FIG. 40 is mounted backward. In either of the bill deposit/withdrawal machine 4 of FIG. 39 for machines of back operation type and the bill deposit/withdrawal machine 5 of FIG. 40 for machines of front operation type, the clerk in charge need not open or close the lower transport path 92 when operating the bill accepting boxes (60, 80) unlike the openable and closable transmission paths 90 and 91 shown in the first to third embodiments. By merely opening and closing the door of the bill box casing 106, the clerk in charge can operate the bill accepting boxes directly.

How the selection of the front operation/back operation in operation method of the clerk in charge is coped with in the fourth embodiment will now be described. The upper transport path 4a is common. The lower bill mechanism 4b and the bill box casing 106 are common, and installed so as to be forward-facing or backward-facing. As for the connection bill transport path, two kinds 540 and 541 are prepared. According to the selection of the front operation/back operation, either the connection bill transport path 540 or 541 is used. It becomes possible to provide such a machine that bill accepting boxes can be easily operated.

According to the present invention, a bill deposit/withdrawal machine having a simple bill transport construction, and a highly reliable bill deposit/withdrawal machine reduced in bill jam not only for Japanese yen bills but also for bills having various sizes can be realized. Furthermore, a highly versatile bill deposit/withdrawal machine capable of coping with various specifications in aspects of operability of the user and the clerk in charge and security.

What is claimed is:

1. A bill deposit/withdrawal machine for performing deposit or withdrawal of bills according to a transaction of a user, comprising:

a deposit/withdrawal port for performing deposit or withdrawal of bills;

a bill discriminating unit for discriminating bills;

at least one bill accepting box for accepting bills transported from said deposit/withdrawal port and/or accepting bills to be transported to said deposit/withdrawal port; and a bill transport path for connecting said deposit/withdrawal port and said bill accepting box to transport bills;

wherein said bill accepting box is transversely disposed to support bills in a standing position;

wherein said at least one bill accepting box includes therein at least one of means for accepting bills transported through said bill transport path and means for delivering bills to be transported through said bill transport path; and wherein said at least one bill accepting box is formed to be detachable from front and back face sides of the bill deposit/withdrawal machine.

2. A bill deposit/withdrawal machine according to claim 1, wherein said at least one bill accepting box includes a plurality of bill accepting boxes arranged in vertical direction.

3. A bill deposit/withdrawal machine according to claim 2, further comprising:

a solid bill box casing for accommodating said bill accepting boxes, said bill box casing including a door through which said bill accepting boxes are took in and out, and a connecting transport path for connecting the bill transport path of the inside of said bill box casing and the bill transport path of the outside of said bill box casing; and a machine casing for accommodating the bill deposit/withdrawal machine including said bill box casing, wherein said machine casing includes a door by which the opening and closing of said door of said bill box casing is enabled, and wherein said deposit/withdrawal port is exposed to enable a user to perform deposit or withdrawal of bills.

4. A bill deposit/withdrawal machine according to claim 3, wherein said bill transport path in said bill box casing is disposed in close vicinity to an inside of said door of said bill box casing.

5. A bill deposit/withdrawal machine according to claim 3, wherein said bill transport path in said bill box casing is disposed between said plurality of bill accepting boxes and said door of said bill box casing, and wherein said door of said machine casing makes said bill transport path in said bill box casing detachable to make said bill accepting boxes detachable.

6. A bill deposit/withdrawal machine for performing deposit or withdrawal of bills according to a transaction of a user, comprising:

a deposit/withdrawal port for performing deposit or withdrawal of bills;

a bill discriminating unit for discriminating bills;

at least one bill accepting box for accepting bills transported from said deposit/withdrawal port and/or accepting bills to be transported to said deposit/withdrawal port;

a solid bill box casing accommodating said at least one bill accepting box, said bill box casing including a door through which said at least one bill accepting box is took in and out; and a bill transport path for connecting said deposit/withdrawal port and said at least one bill accepting box to transport bills;

wherein said at least one bill accepting box is transversely disposed to support bills in a standing position;

wherein said at least one bill accepting box includes therein at least one of means for accepting bills transported through said bill transport path and means for delivering bills to be transported through said bill transport path; and wherein said at least one bill accepting box is formed to be detachable from front and back face sides of the bill deposit/withdrawal machine.

7. A bill deposit/withdrawal machine according to claim 6, wherein said at least one bill transport path in said bill box casing is disposed between said bill accepting box and said door of said bill box casing and make the opening and closing thereof possible, and wherein said at least one bill accepting box is made detachable when said door of said bill box casing and said bill transport path in said bill box casing are opened.

* * * * *